(12) United States Patent
Ziebold et al.

(10) Patent No.: US 7,387,656 B2
(45) Date of Patent: Jun. 17, 2008

(54) FIBER COLLECTING MEDIA STRIP FOR A MIST ELIMINATOR

(75) Inventors: Steven A. Ziebold, Waterloo, IL (US); Douglas E. Azwell, Maryland Heights, MO (US); Fredrick L. Mueller, Herculaneum, MO (US); John S. Merz, Imperial, MO (US); Pierre L. Eemans, Aalst (BE)

(73) Assignee: MECS, Inc., Chesterfield, MO (US)

( * ) Notice: Subject to any disclaimer, the term of this patent is extended or adjusted under 35 U.S.C. 154(b) by 453 days.

(21) Appl. No.: 11/031,820

(22) Filed: Jan. 7, 2005

(65) Prior Publication Data

US 2006/0150594 A1 Jul. 13, 2006

(51) Int. Cl.
*B01D 46/00* (2006.01)

(52) U.S. Cl. .......................... 55/486; 55/423; 55/487; 55/498; 55/502

(58) Field of Classification Search .......... 55/485–487, 55/498, 502, 423; 95/287; 210/491
See application file for complete search history.

(56) References Cited

U.S. PATENT DOCUMENTS

| | | | |
|---|---|---|---|
| 2,569,367 A | 9/1951 | Bradner et al. | |
| 3,085,381 A | 4/1963 | Sobeck | |
| 3,093,469 A | 6/1963 | Woolston et al. | |
| 3,477,211 A * | 11/1969 | Pietsch | 55/418 |
| 3,527,027 A | 9/1970 | Knight et al. | |
| 3,802,160 A | 4/1974 | Foltz | |
| 4,048,075 A * | 9/1977 | Colvin et al. | 210/484 |
| 4,050,237 A | 9/1977 | Pall et al. | |
| 4,053,290 A | 10/1977 | Chen et al. | |
| 4,086,070 A * | 4/1978 | Argo et al. | 95/278 |
| 4,233,042 A | 11/1980 | Tao | |
| 4,234,323 A | 11/1980 | Maher | |
| 4,249,918 A * | 2/1981 | Argo et al. | 95/273 |
| 4,267,626 A * | 5/1981 | Terry | 29/896.62 |

(Continued)

FOREIGN PATENT DOCUMENTS

AU 776507 B2 6/2000

(Continued)

OTHER PUBLICATIONS

Monsanto Enviro-Chem Systems, Inc., Brink® Mist Eliminators, 1990, 12 Pgs.

(Continued)

*Primary Examiner*—Duane Smith
*Assistant Examiner*—Ives Wu
(74) *Attorney, Agent, or Firm*—Senniger Powers LLP

(57) ABSTRACT

A fiber bed mist eliminator has a fiber bed which is formed of a composite fiber bed collecting media strip including a collection layer which is not subjected to needle punching. The fiber bed can be made very thin while retaining high efficiency in removing small particles of aerosol from a gas stream passing through the fiber bed. The fiber bed collecting media strip lends itself to be applied to the mist eliminator by spirally wrapping the element onto the mist eliminator. The fiber bed collecting media strip can overlap itself to seal at the locations where the fiber element overlaps itself. The fiber bed collecting media strip can be provided to the field in different formats for use in making a mist eliminator fiber bed.

60 Claims, 18 Drawing Sheets

U.S. PATENT DOCUMENTS

| | | | |
|---|---|---|---|
| 4,443,233 A | | 4/1984 | Moran |
| 4,564,377 A | * | 1/1986 | Kocatas .................. 55/488 |
| 4,676,807 A | | 6/1987 | Miller et al. |
| 4,759,782 A | * | 7/1988 | Miller et al. .................. 55/487 |
| 4,818,257 A | * | 4/1989 | Kennedy et al. .............. 95/286 |
| 4,877,527 A | | 10/1989 | Brownell |
| 4,878,929 A | | 11/1989 | Tofsland et al. |
| 4,915,714 A | * | 4/1990 | Teague et al. .................. 55/486 |
| 4,948,398 A | | 8/1990 | Thomaides et al. |
| 4,976,759 A | | 12/1990 | Foltz |
| 5,039,413 A | * | 8/1991 | Harwood et al. ........... 210/457 |
| 5,045,094 A | | 9/1991 | Paranjpe |
| 5,409,515 A | * | 4/1995 | Yamamoto et al. ........ 55/341.1 |
| 5,415,676 A | | 5/1995 | Tokar et al. |
| 5,454,858 A | | 10/1995 | Tokar et al. |
| 5,543,047 A | | 8/1996 | Stoyell et al. |
| 5,605,748 A | * | 2/1997 | Kennedy et al. .............. 55/486 |
| 5,639,370 A | * | 6/1997 | Fall et al. .................... 210/489 |
| 5,660,607 A | | 8/1997 | Jokschas et al. |
| 5,690,765 A | | 11/1997 | Stoyell et al. |
| 5,725,784 A | | 3/1998 | Geibel et al. |
| 5,800,584 A | | 9/1998 | Hinderer et al. |
| 5,871,557 A | | 2/1999 | Tokar et al. |
| 5,876,601 A | * | 3/1999 | Geibel et al. ............. 210/493.1 |
| 5,935,284 A | | 8/1999 | Tokar et al. |
| 5,961,678 A | | 10/1999 | Pruette et al. |
| 6,007,608 A | | 12/1999 | Johnson |
| 6,113,784 A | | 9/2000 | Stoyell et al. |
| 6,171,684 B1 | | 1/2001 | Kahlbaugh et al. |
| 6,702,941 B1 | | 3/2004 | Haq et al. |
| 6,858,051 B2 | | 2/2005 | Uhlenbrock |
| 6,932,907 B2 | * | 8/2005 | Haq et al. ................. 210/433.1 |
| 7,115,150 B2 | | 10/2006 | Johnson et al. |
| 2001/0037982 A1 | | 11/2001 | Pulek et al. |
| 2004/0004110 A1 | | 1/2004 | Blackbume, Jr. |
| 2004/0040272 A1 | | 3/2004 | Uhlenbrock |
| 2004/0162203 A1 | | 8/2004 | Stoyell et al. |
| 2007/0137156 A1 | | 6/2007 | Da Costa et al. |
| 2007/0175191 A1 | | 8/2007 | Ziebold et al. |

FOREIGN PATENT DOCUMENTS

| | | | |
|---|---|---|---|
| DE | 3311324 A1 | | 10/1984 |
| DE | 19508815 A1 | | 9/1996 |
| DE | 19540876 A1 | | 5/1997 |
| EP | 0 612 551 A2 | | 8/1994 |
| EP | 1010451 A1 | | 6/2000 |
| GB | 1271867 | | 4/1972 |
| JP | 2004-290858 | * | 10/2004 |
| SE | WO 03/028851 A1 | * | 4/2003 |
| WO | WO 03/028851 A1 | | 4/2003 |
| WO | 03103798 A1 | | 12/2003 |

OTHER PUBLICATIONS

PCT Search Report for PCT/US2006/000482 dated Aug. 2, 2006, 1 pp., European Patent Office.

Agranovski, I.F., et al., "Filtration of Liquid Aerosols on Wettable Fibrous Filters," AIChE Journal, Dec. 1998, vol. 44, No. 12.

Monsanto Enviro-Chem Systems, Inc., Brink® Mist Eliminators, 1990, 12 Pages.

* cited by examiner

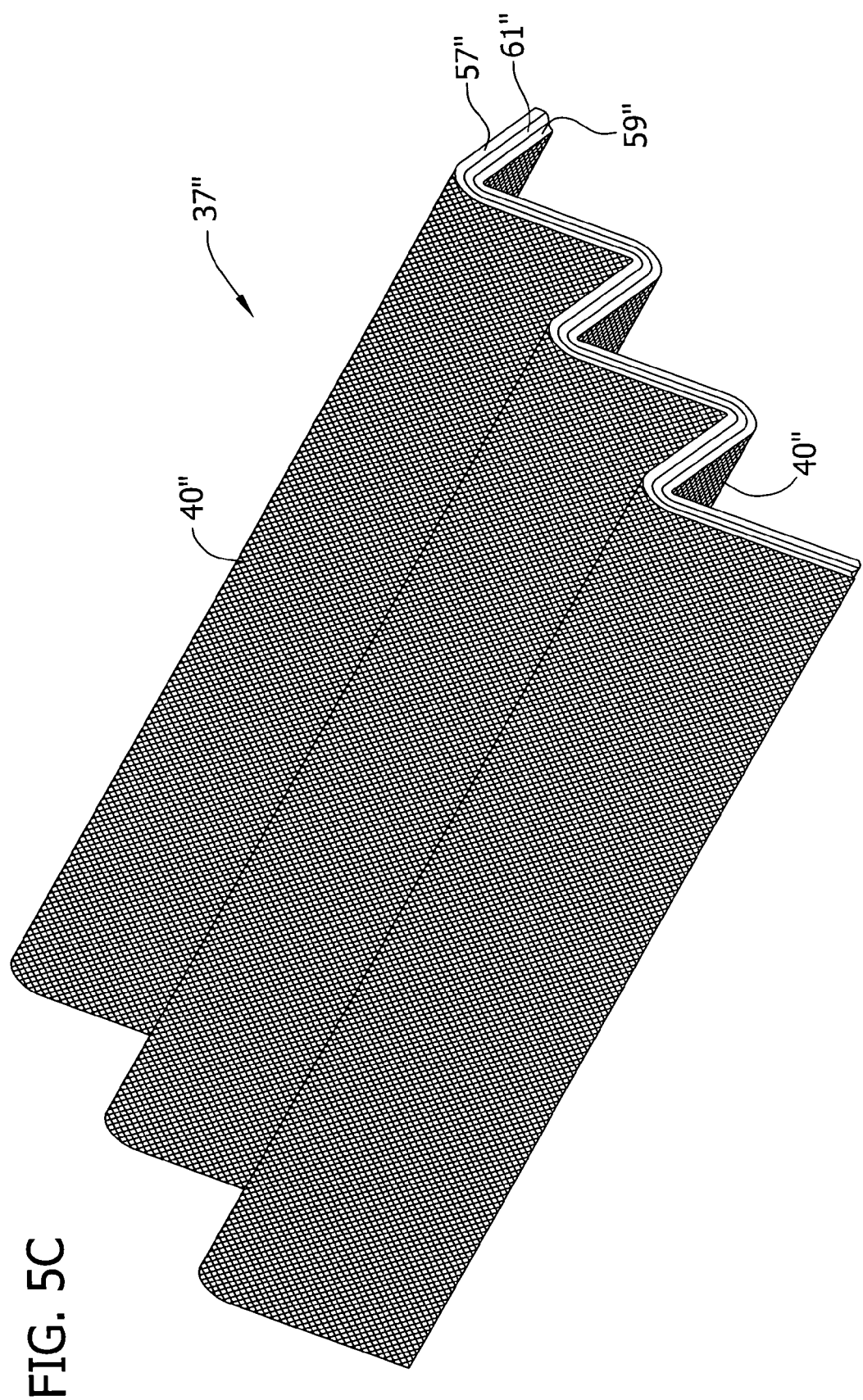

FIG. 14A

| Flow Condition | w | Vb | CFM/ft of Bed | dP | Co, dry | Co, wet | W/D | Eff >3 | Eff <= 3 | Eff < 1 | Eff @ 0.6 | Eff @ 0.3 | OA Eff |
|---|---|---|---|---|---|---|---|---|---|---|---|---|---|
| LVLL | 1.5 | 23.4 | 123.4 | 4.2 | 0.12645 | 0.1815 | 1.4351 | 83.48 | 92.06 | 91.84 | 92.78 | 87.88 | 92.56 |
| LVHL | 45.3 | 23.4 | 123.4 | 7.1 | 0.12645 | 0.3049 | 2.4110 | 99.99 | 97.1 | 94.93 | 94.23 | 86.48 | 99.44 |
| HVLL | 1.6 | 46.7 | 246.8 | 8.7 | 0.12645 | 0.1852 | 1.4650 | 98.59 | 89.89 | 89 | 92.99 | 88.31 | 95.41 |
| HVHL | 42.1 | 46.7 | 246.8 | 11.2 | 0.12645 | 0.2387 | 1.8875 | 100 | 97.66 | 96.09 | 97.23 | 93.76 | 99.8 |

FIG. 14B

| Flow Condition | w | Vb | CFM/ft of Bed | dP | Co, dry | Co, wet | W/D | Eff >3 | Eff < 3 | Eff < 1 | Eff @ 0.6 | Eff @ 0.3 | OA Eff |
|---|---|---|---|---|---|---|---|---|---|---|---|---|---|
| LVLL | 1.8 | 23.4 | 134.8 | 2.4 | 0.0638 | 0.1024 | 1.6050 | 98.47 | 99.37 | 99.46 | 99.43 | 99.65 | 99 |
| LVHL | 47.4 | 23.4 | 134.8 | 5.5 | 0.0638 | 0.2329 | 3.6506 | 99.96 | 98.46 | 97.37 | 97.89 | 96.96 | 99.41 |
| HVLL | 2.0 | 46.7 | 269.0 | 5.2 | 0.0638 | 0.1119 | 1.7537 | 99.79 | 99.79 | 99.71 | 100 | 100 | 99.79 |
| HVHL | 58.2 | 42.9 | 247.3 | 9.9 | 0.0638 | 0.2313 | 3.6254 | 99.85 | 98.4 | 97.2 | 98.44 | 96.92 | 99.59 |
| HHVLL | 2.7 | 59.0 | 339.8 | 11.1 | 0.0638 | 0.1881 | 2.9488 | 99.17 | 98.37 | 97.71 | 99.27 | 98.98 | 98.82 |

FIG. 15

| Flow Condition | Vb (fpm) | W (mg/cf) | Bed Thickness inches | %Effy on 0.3 micron | dP in. H$_2$O |
|---|---|---|---|---|---|
| LVLL | 23.4 | 1.8 | 0.3 | 94.1 | 1.2 |
|  | 23.4 | 1.8 | 0.6 | 99.65 | 2.4 |
|  | 23.4 | 1.8 | 0.9 | 99.98 | 3.6 |
|  | 23.4 | 1.8 | 1.2 | 99.999 | 4.8 |
|  |  |  |  |  |  |
| LVHL | 23.4 | 47.4 | 0.3 | 82.6 | 2.7 |
|  | 23.4 | 47.4 | 0.6 | 97.0 | 5.5 |
|  | 23.4 | 47.4 | 0.9 | 99.5 | 8.2 |
|  | 23.4 | 47.4 | 1.2 | 99.9 | 10.9 |
|  |  |  |  |  |  |
| HVLL** | 46.7 | 2 | 0.3 | 83.2 | 2.6 |
|  | 46.7 | 2 | 0.6 | 97.2 | 5.2 |
|  | 46.7 | 2 | 0.9 | 99.5 | 7.8 |
|  | 46.7 | 2 | 1.2 | 99.9 | 10.5 |
|  |  |  |  |  |  |
| HVHL | 42.9 | 58.2 | 0.3 | 82.4 | 5.0 |
|  | 42.9 | 58.2 | 0.6 | 96.9 | 9.9 |
|  | 42.9 | 58.2 | 0.9 | 99.5 | 14.9 |
|  | 42.9 | 58.2 | 1.2 | 99.9 | 19.9 |
|  |  |  |  |  |  |
| HHVLL | 59 | 2.7 | 0.3 | 89.9 | 5.6 |
|  | 59 | 2.7 | 0.6 | 99.0 | 11.1 |
|  | 59 | 2.7 | 0.9 | 99.9 | 16.7 |
|  | 59 | 2.7 | 1.2 | 99.99 | 22.3 |

** Collection efficiency measured for 0.2 micron particles

FIBER COLLECTING MEDIA STRIP FOR A MIST ELIMINATOR

BACKGROUND

This invention relates generally to fiber bed mist eliminators, and fiber beds and collecting media therefor.

Fiber bed mist eliminators have wide industrial application in the removal of aerosols from gas streams. The generation of aerosols ("mist") in gas streams is common in the course of manufacturing processes. Aerosols can be formed, for instance, as a result of mechanical forces (e.g., when a flow including a liquid runs into a structure) that atomize a liquid. Cooling of a gas stream may result in the condensation of vapor to form a mist, and chemical reactions of two or more gases may take place at temperatures and pressures where the reaction products are mists. However the aerosol comes to be in the gas stream, it can be undesirable to inject the aerosol into other processing equipment because the aerosol may be corrosive or otherwise lead to damage or fouling of the processing equipment. Moreover, it can be undesirable to exhaust certain aerosols to the environment. Some of the more frequent applications of fiber bed mist eliminators include removal of acid mists, such as sulfuric acid mists, in acid manufacturing, removal of plasticizer mists in the manufacture of polyvinyl chloride floor or wall coverings and removal of water-soluble solid aerosols from the emissions of ammonium nitrate prill towers. In these various applications, fiber bed mist eliminators may achieve separation efficiencies of 99% or greater depending upon, among other things, the thickness of the fiber bed.

It is generally known that fibers made of various materials may be used to construct fiber beds for fiber bed mist eliminators. The fiber bed is designed to collect fine liquid mist and soluble solid particles entrained in a moving gas stream and drain them through the structure of the bed. Typically, beds of collecting fibers are associated with metal wire screens or similar external support structures. The combination of a bed of collecting fibers and external support structure is known as a fiber bed assembly. As used hereinafter, fiber bed refers to that portion of the fiber bed assembly apart from any such support structure. Fiber beds may be formed by packing bulk fiber between two opposing support screens (bulk-packed beds), pre-forming a tube of fiber bed material, or winding a roving made of fibers around a cylindrical support screen (wound beds). Although not limited to such a configuration, fiber bed assemblies are most often configured in the form of a vertical cylinder. Cylindrical fiber bed assemblies permit a high effective fiber bed surface area in a minimum of space. Flat fiber bed assemblies on the other hand, find particular application for smaller gas flows.

In operation, a horizontal stream of gas containing a liquid and/or wetted soluble solid aerosol is made to penetrate-and pass through the fiber bed of the fiber bed assembly. The fibers in the fiber bed capture the aerosol in the gas by the mechanisms of impaction, interception, and Brownian diffusion. The captured aerosol coalesces on the fibers to form droplets of liquid in the fiber bed. The moving gas urges the droplets to move toward the downstream face of the fiber bed where the captured liquid exits the fiber bed and drains downward under the force of gravity.

The fibers which make up the fiber bed may be made from a variety of materials. Materials utilized to make bed fiber include, for example, metals such as stainless steel, titanium, etc., fibers of polymeric materials such as polyesters, polyvinylchloride, polyethylene terphthalate, nylons, polyethylene, polypropylene etc., and glass. In applications where corrosive conditions and/or high temperatures are encountered, long staple, chemical grade glass fibers have found particularly widespread use in fiber beds of fiber bed mist eliminators. Fibers ranging in diameter from 5 microns or less to more than 200 microns, as well as combinations of fibers of varying diameters, have been used in fiber beds. The bulk density of prior art fiber beds ranges from about 5 $lb/ft^3$ (80 $kg/m^3$) to greater than 20 $lb/ft^3$ (320 $kg/m^3$), while fiber bed thickness ranges from about 0.5 to about 6 inches (1 to 15 cm) or more, depending upon the desired separation efficiency.

In order for a fiber bed to function effectively, the bed must be mechanically stable. A mechanically stable fiber bed is one which will retain its structural integrity without substantial shifting of the fibers relative to adjacent fibers when exposed to the forces exerted by the gas being treated and the captured and draining liquid during aerosol collection. If mechanical stability is not maintained, the performance characteristics of the bed will be unfavorably altered. In a fiber bed lacking mechanical stability, the moving gas stream forces the fibers to shift substantially, causing the liquid ladened fibers in some portions of the fiber bed to mat or felt while increasing the void space between adjacent fibers in other portions of the fiber bed. Matted portions of the fiber bed are more resistant to both the flow of gas and the drainage of captured liquid. Captured liquid which is unable to drain is often reentrained by the moving gas stream, resulting in reduced separation efficiency. Also, the pressure drop across matted portions of an unstable fiber bed is increased. On the other hand, in those portions of a mechanically unstable fiber bed where fiber shifting has increased the average void space between adjacent fibers, macroscopic pores or channels form which reduce separation efficiency by allowing the aerosol containing gas to pass through the fiber bed without sufficient contact with the collecting fibers. In bulk-packed and wound fiber bed assemblies, mechanical stability is largely dependent upon the bulk density of the fiber bed. In these conventionally constructed fiber bed assemblies, a fiber bed bulk density within the range disclosed by the prior art typically provides sufficient contact between adjacent fibers to prevent substantial movement of the fibers when exposed to the forces exerted by the moving gas stream. In bulk-packed fiber beds, density of the fiber bed and resistance to fiber movement is maintained by the reactive compressive force applied against the packed fibers by the two opposing support screens. In preformed fiber bed tubes, the materials may be needled punched or heat formed so that there is significant fiber entanglement or fiber bonding to strengthen the overall bed. Preformed fiber bed tubes have to be reset or adjusted overtime because the fibers shift within the bed. In wound fiber beds, density of the fiber bed necessary to provide mechanical stability is a result of several factors including the tension in the roving as it is wound around the cylindrical support screen and compression of the fiber bed by a wire screen or similar structure which may be wound on the cylinder adjacent to the exterior surface of the fiber roving.

However, bulk density cannot be increased indiscriminately to achieve mechanical stability. If the bulk density of a fiber bed is increased too much, the bed will be prone to flooding. An effective fiber bed is a relatively open structure that allows free gas flow and liquid drainage even when the collecting fibers are coated with collected liquid. There must be sufficient void space between adjacent fibers in the bed so that collected liquid is not able to bridge the space between adjacent fibers to such an extent that the adherence of collected liquid to the surface of fibers prevents the liquid from draining.

A measure of the open space in a fiber bed is void fraction which is defined by the bulk density of the fiber bed and the average density of the fiber material according to the following formula:

$$\text{fiber bed void fraction} = 1 - [\text{fiber bed bulk density}/\text{average fiber material density}]$$

Fiber beds typically have a void fraction of greater than about 0.89.

It is generally known that the thickness of a fiber bed can be decreased without a loss in separation efficiency by decreasing the average fiber diameter of the fiber material comprising the fiber bed. However, for bulk-packed and wound fiber beds comprising fibers having an average diameter of less than about 5 microns, when the bulk density is high enough to ensure mechanical stability, the resulting void fraction is so low that the bed tends to flood under typical operating conditions. Also, it has been found that conventional thin wound beds are inherently less uniform. A flooded bed is a fiber bed in which captured liquid largely fills the void spaces between adjacent fibers in the fiber bed. A flooded fiber bed is much like the matted portions of an unstable fiber bed. The captured liquid in a flooded fiber bed cannot properly drain and instead may be reentrained in the moving gas stream at the downstream face of the fiber bed. Furthermore, the pressure drop across a fiber bed assembly is increased when the fiber bed is flooded. If a pressure differential across the fiber bed sufficient to overcome the force of adhesion and dislodge the collected droplets from the fibers is employed, the collected liquid is blown from the downstream face of the fiber bed where it is reentrained by the gas stream resulting in low separation efficiency and increased operating cost.

In order to prevent a fiber bed comprising small average diameter fibers from flooding, the specific fiber surface area, expressed as the area of fiber per unit volume of the fiber bed, may be decreased by decreasing the bulk density of the bed (i.e., increasing the void fraction). However, if the bulk density of a bulk-packed or wound fiber bed comprising fibers having an average diameter less than about 5 microns is reduced to a value sufficient to avoid flooding, such fiber beds lack the mechanical stability necessary to withstand the forces exerted by the moving gas stream. As a result, the moving gas stream causes the fibers to shift substantially resulting in the fiber bed matting and/or channeling as previously described. Therefore, in practice, conventionally constructed high efficiency fiber bed assemblies comprise fiber beds 2 to 6 inches (6 to 15 cm) thick constructed of fibers having an average fiber diameter between 5 and 15 microns and having a bulk density between 5 and 15 lb/ft$^3$ (80 and 240 kg/m$^3$).

In contrast to fiber beds used in mist eliminators, some other types of gas filters, such as baghouse, clean room and breathing filters, may successfully utilize glass fibers with average diameters below 5 microns and may even include fibers having a diameter less than 1 micron. However, these types of gas filters are distinguished from fiber bed mist eliminators in that they are typically designed to utilize pore and surface filtration in collecting solid particulates or only relatively small amounts of liquid aerosols. If used to collect liquid aerosols, they easily flood at the liquid loading rates typically encountered in fiber bed mist eliminators. By comparison, fiber bed mist eliminators are designed to allow comparatively large quantities of liquid entrained in a moving gas stream to penetrate the fiber bed where the liquid is captured and continuously drained. Therefore, a solution to the problems associated with utilizing small diameter fibers in fiber beds of fiber bed mist eliminators is neither shown nor suggested by the prior art concerned with such other gas filters.

Reentrainment of collected liquid by the moving gas stream at the downstream face of a fiber bed is often a problem in fiber bed mist eliminator applications, especially in operations characterized by high liquid loading rates or high gas stream velocities. Satisfactory solutions to this problem have included combining a layer of primary filtration fibers and a layer of drainage fibers to form a fiber bed. The drainage layer is downstream of the primary filtration layer and usually comprises fibers with a larger average diameter than those fibers comprising the primary filtration layer.

Despite their success, fiber bed assemblies of the prior art have several disadvantages resulting from shortcomings in the fiber bed. Wound fiber bed assemblies are typically formed using a fiber roving which is roughly cylindrical in shape. The roving is wound around a cylindrical forming screen and back and forth along the length of the screen. This requires skill and the appropriate machinery. Even if the winding is executed correctly, the resultant wound fiber bed may have significant differences in gas flow over the surface area of the bed. These variations are a result of the inherent difficulty of forming a uniform surface on a cylinder using a cylindrical roving. Normal variations in the roving material cause the roving to flatten to different degrees, which affects the uniformity of the fiber bed formed by the roving. The non-uniformity is particularly observed in wound fiber beds having smaller thicknesses.

Another disadvantage associated with bulk-packed and wound fiber bed assemblies is the need to remove the assemblies from the mist eliminator and return them to the manufacturer when the fiber bed needs replacement. Aside from the inconvenience of transporting the heavy support structure, an interchangeable spare fiber bed assembly must be available for the fiber bed mist eliminator to be returned to service and avoid extensive down time. Field replacement of the fiber bed is hampered by difficulties in assembling the fiber bed. Considerable skill and time are required to properly pack new bulk fiber between opposing support screens so that inhomogeneities in the fiber bed are minimized, while winding fiber onto a cylindrical support structure requires extensive machinery. Precast or preformed fiber bed sections have been used by some manufacturers but these have suffered from leakage at joints or settling, requiring extra field maintenance and adjustment. This reduces the productivity of the plant in which the fiber bed is used because the plant must be shut down to carry out the maintenance and/or adjustments.

A third disadvantage is that because fibers having an average fiber diameter of less than about 5 microns cannot be used effectively in constructing a conventional fiber bed without additional processing (e.g., needle punching), fiber bed thickness in applications requiring high separation efficiency cannot be reduced. If thinner high efficiency fiber beds were possible in severe industrial process environments, fiber beds could be configured into shapes that maximize the fiber bed surface area in a given volume available for a fiber bed mist eliminator. This would be analogous to the dry filter art where thin filter papers and felts allow high surface area filter forms via pleating. Thinner, high efficiency fiber beds having increased fiber bed surface area would allow the operating cost of fiber bed mist eliminators to be decreased by decreasing the pressure drop across the fiber bed.

SUMMARY OF THE INVENTION

In one aspect of the present invention, a fiber bed assembly for a fiber bed mist eliminator used to remove aerosols and/or wetted soluble solids from a moving gas stream generally comprises a fiber bed support having a wall defining an upstream space and a downstream space. The wall includes openings therein to permit the gas stream to move generally freely through the wall from the upstream space to the downstream space. A fiber bed is supported by the fiber bed support and generally covers the wall openings so that the gas stream passes through the fiber bed moving from the upstream space to the downstream space. The fiber bed comprising a composite fiber bed collecting media strip generally including an outer layer of needle punched fibers constructed to provide structural integrity to the fiber bed, and an inner layer of needle punched fibers constructed to provide structural integrity to the fiber bed. An intermediate layer sandwiched between the outer and inner layers is non-needle punched.

In another aspect of the present invention, a fiber bed collecting media strip can be used to form a fiber bed of a mist eliminator used to remove aerosols and/or wetted soluble solids from a moving gas stream. The fiber bed is adapted to generally cover a support structure of the mist eliminator for generally blocking flow of the gas stream through the support structure except for through the fiber bed. The fiber bed collecting media strip has the same general construction as set forth in the preceding paragraph.

In yet another aspect of the present invention, a composite fiber bed collecting media strip can be used in making a fiber bed for a fiber bed mist eliminator used to remove aerosols and/or wetted soluble solids from a moving gas stream. The fiber bed is adapted to generally cover a support structure of the fiber bed assembly for generally blocking flow of the gas stream through the support structure except for through the fiber bed. The composite fiber bed collecting media strip generally comprises an outer layer of fibers constructed to provide structural integrity to the composite fiber bed collecting media strip. An inner layer of fibers is constructed to provide structural integrity to the composite fiber bed collecting media strip. An intermediate layer sandwiched between the outer and inner layers is more efficient in the removal of aerosols from the gas stream than the outer and inner layers. At least the outer and inner layers are formed to separate into strips including an outer layer section, and inner layer section and an intermediate layer section.

In still another aspect of the present invention, a fiber bed assembly for a fiber bed mist eliminator used to remove aerosols and/or wetted soluble solids from a moving gas stream generally comprises a fiber bed support having a wall defining an upstream space and a downstream space. The wall includes openings therein to permit the gas stream to move generally freely through the wall from the upstream space to the downstream space. A fiber bed is supported by the fiber bed support and generally covers the wall openings so that the gas stream passes through the fiber bed moving from the upstream space to the downstream space. The fiber bed comprises an elongate fiber bed collecting media strip wrapped around the fiber bed support in multiple turns, at least some of the turns extending along a spiral path. The fiber bed collecting media strip is generally flat and at least some of the turns overlap adjacent turns.

In a further aspect of the present invention, a fiber bed assembly for a fiber bed mist eliminator used to remove aerosols and/or wetted soluble solids from a moving gas stream generally comprises a fiber bed support having a wall defining an upstream space and a downstream space. The wall includes openings therein to permit the gas stream to move generally freely through the wall from the upstream space to the downstream space. A fiber bed is supported by the fiber bed support and generally covers the wall openings so that the gas stream passes through the fiber bed moving from the upstream space to the downstream space. The fiber bed comprises an elongate fiber bed collecting media strip wrapped around the fiber bed support. At least some of the turns extend along a spiral path, and at least some of the turns overlap adjacent turns. An intermediate drainage layer is located between adjacent turns of the fiber bed collecting media strip.

In still a further aspect of the present invention, a fiber bed collecting media strip can be used in making a fiber bed for a fiber bed mist eliminator used to remove aerosols and/or wetted soluble solids from a moving gas stream. The fiber bed is adapted to generally cover a support structure of the fiber bed mist eliminator for generally blocking flow of the gas stream through the support structure except for through the fiber bed. The fiber bed collecting media strip generally comprises an elongate strip formed of fibers capable of removing aerosols from the moving gas stream. The strip is sized for covering the support structure by wrapping around the support structure in multiple overlapping turns. The strip has opposite, generally flat faces, at least one of the faces having an alignment marking thereon positioned for aligning the overlap of an adjacent turn of the strip.

In another aspect of the present invention, a fiber bed used for a fiber bed mist eliminator used to remove aerosols and/or wetted soluble solids from a moving gas stream is adapted to generally cover a support structure of the mist eliminator for generally blocking flow of the gas stream through the support structure except for through the fiber bed. The fiber bed has a compressed thickness of about 0.6 inches (1.5 cm). The fiber bed also has a collecting media strip constructed to remove at least about 99.09% of aerosol particles having a size of 0.3 microns from a gas stream having a loading of 2.7 $mg/ft^3$ (95 $mg/m^3$) of a polyalpha-olefin oil and moving at a velocity of about 59 feet per minute (18.0 meters per minute). The pressure drop across the fiber bed is less than or equal to about 11.1 inches of water (2.76 kPa).

A fiber bed for a fiber bed mist eliminator used to remove aerosols and/or wetted soluble solids from a moving gas stream is adapted to generally cover a support structure of the mist eliminator for generally blocking flow of the gas stream through the support structure except for through the fiber bed. The fiber bed has a compressed thickness of about 0.6 inches (1.5 cm) and has a collecting media strip constructed to remove at least about 99.65% of aerosol particles having a size of 0.3 microns from a gas stream having a loading of 1.8 $mg/ft^3$ (64 $Mg/m^3$) of a polyalpha-olefin oil and moving at a velocity of about 23.4 feet per minute (7.1 meters per minute). The pressure drop across the fiber bed is less than or equal to about 2.4 inches of water (0.60 kPa).

A fiber bed assembly for a fiber bed mist eliminator used to remove aerosols and/or wetted soluble solids from a moving gas stream generally comprises a fiber bed support having a wall defining an upstream space and a downstream space. The wall includes openings therein to permit the gas stream to move generally freely through the wall from the upstream space to the downstream space. A fiber bed is supported by the fiber bed support and generally covers the wall openings so that the gas stream passes through the fiber bed moving from the upstream space to the downstream space. The fiber bed comprises a composite fiber bed collecting media strip including a first layer of needle punched fibers constructed to provide structural integrity to the fiber bed. A collection layer supported by the first layer is non-needle punched.

Other objects and features of the present invention will be in part apparent and in part pointed out hereinafter.

BRIEF DESCRIPTION OF THE DRAWINGS

FIG. 5C is a perspective of a pleated fiber bed collecting media strip;

FIG. 14A is a table showing performance results of a conventional fiber bed;

FIG. 14B is a table showing performance of a fiber bed of the present invention; and FIG. 15 is a table showing performance of fiber beds of the present invention.

Corresponding reference characters indicate corresponding parts throughout the several views of the drawings.

DETAILED DESCRIPTION

Figure 1:
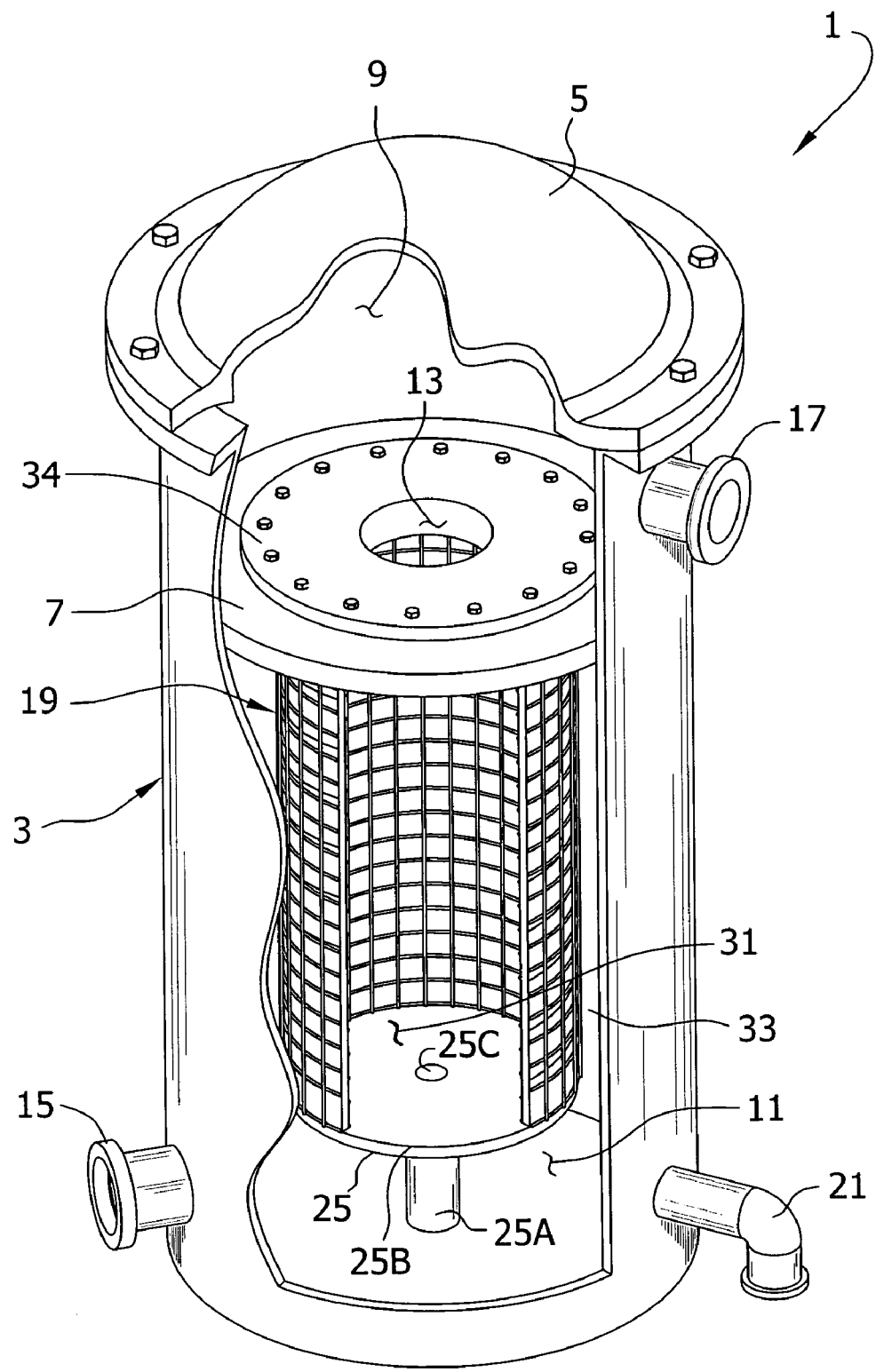
FIG. 1 is a perspective of a mist eliminator with a portion of a tank thereof broken away to show a fiber bed assembly of the mist eliminator constructed according to the principles of the present invention.

Referring now to the drawings and in particular to FIG. 1, a mist eliminator (indicated generally at 1) is of the type that can be placed in the flow line of a stream of gas to remove aerosols and/or wetted soluble solids from the stream of gas. The mist eliminator is of the type that has particular application for use in gas streams having a liquid aerosol content (especially where there are liquid aerosol particles having a submicron size) to be removed from the gas stream. The mist eliminator 1 includes a tank (generally indicated at 3) having a removable lid 5 sealingly attached to the tank to close an open top of the tank. An annular mounting plate 7 within the tank 3 divides the tank into an upper chamber 9 and a lower chamber 11. The gas stream may pass from the lower chamber 11 to the upper chamber 9 only through a center hole 13 of the annular mounting plate 7. The tank 3 includes a gas stream inlet 15 for receiving a stream of gas ladened with aerosol and/or wetted soluble solids into the lower chamber 11 of the tank, and a filtered, clean gas stream outlet 17 in fluid communication with the upper chamber 9 in the tank to permit filtered, clean gas to pass out of the mist eliminator 1 to an exhaust or other processing equipment (not shown).

A fiber bed assembly, indicated generally at 19, is located in the lower chamber 11 of the tank 3 and has a generally tubular shape with a closed bottom and an open top. The filter bed assembly 19 is sealingly mounted on the mounting plate 7 so that an open top of the filter bed assembly is in registration with the center hole 13 of the mounting plate. Gas cannot flow from the lower chamber 11 to the upper chamber 9 unless it passes through the fiber bed assembly 19. The mounting plate 7 supports the filter bed assembly 19 within the tank 3 so that the filter bed assembly hangs down from the mounting plate. The fiber bed assembly removes a very high percentage of the aerosol and/or wetted soluble solids from the gas stream, which is drained to the bottom of the tank 3. A drain pipe 21 near the bottom of the tank 3 drains off liquids and/or wetted soluble and dissolved solids that are collected in the bottom of the tank.

The illustrated mist eliminator 1 of FIG. 1 is a forward flow or "hanging style" mist eliminator. It is also known to have a reverse flow mist eliminator (not shown). The construction of a fiber bed of the reverse flow mist eliminator will be described further in relation to FIG. 7, but generally speaking the flow of the gas stream is opposite the flow in a forward flow mist eliminator as shown in FIG. 1. Thus, the gas stream would enter through what has been designated the gas stream outlet 17 of the mist eliminator 1 of FIG. 1. The gas would pass into the fiber bed assembly 19 through the center hole 13 of the mounting plate 7 and open top of the fiber bed assembly. The gas would then pass radially outwardly through the fiber bed assembly 19 and out through the gas stream inlet 15. Liquid and wetted or dissolved soluble solids captured by the fiber bed assembly 19 would be drained from the outside of the assembly into the bottom of the tank 3 in a reverse flow mist eliminator and removed by something like the tank drain pipe 21. It will be understood that the present invention applies to both forward and reverse flow mist eliminators.

Figure 2:
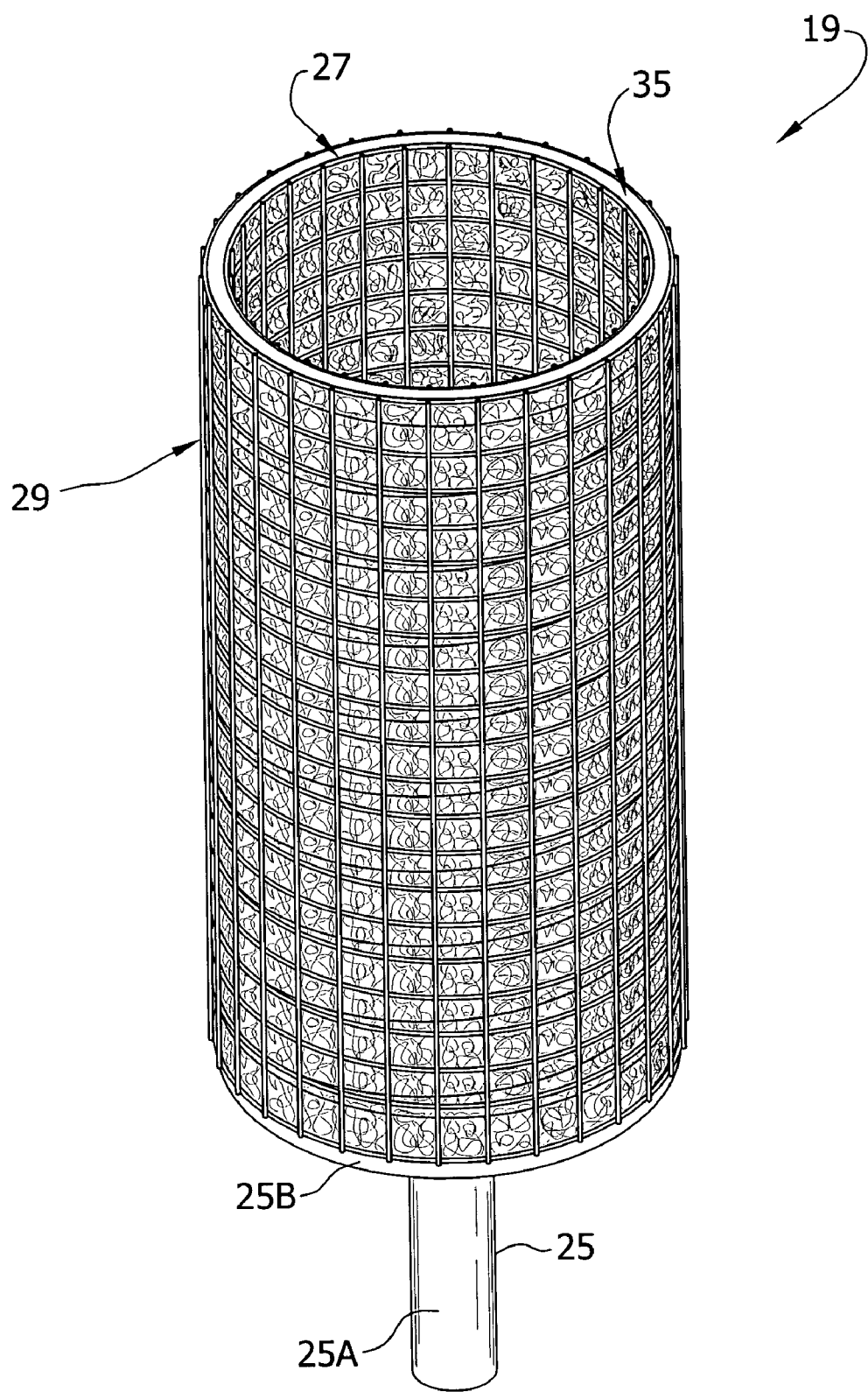
FIG. 2 is an enlarged perspective of the fiber bed assembly.
Figure 3:
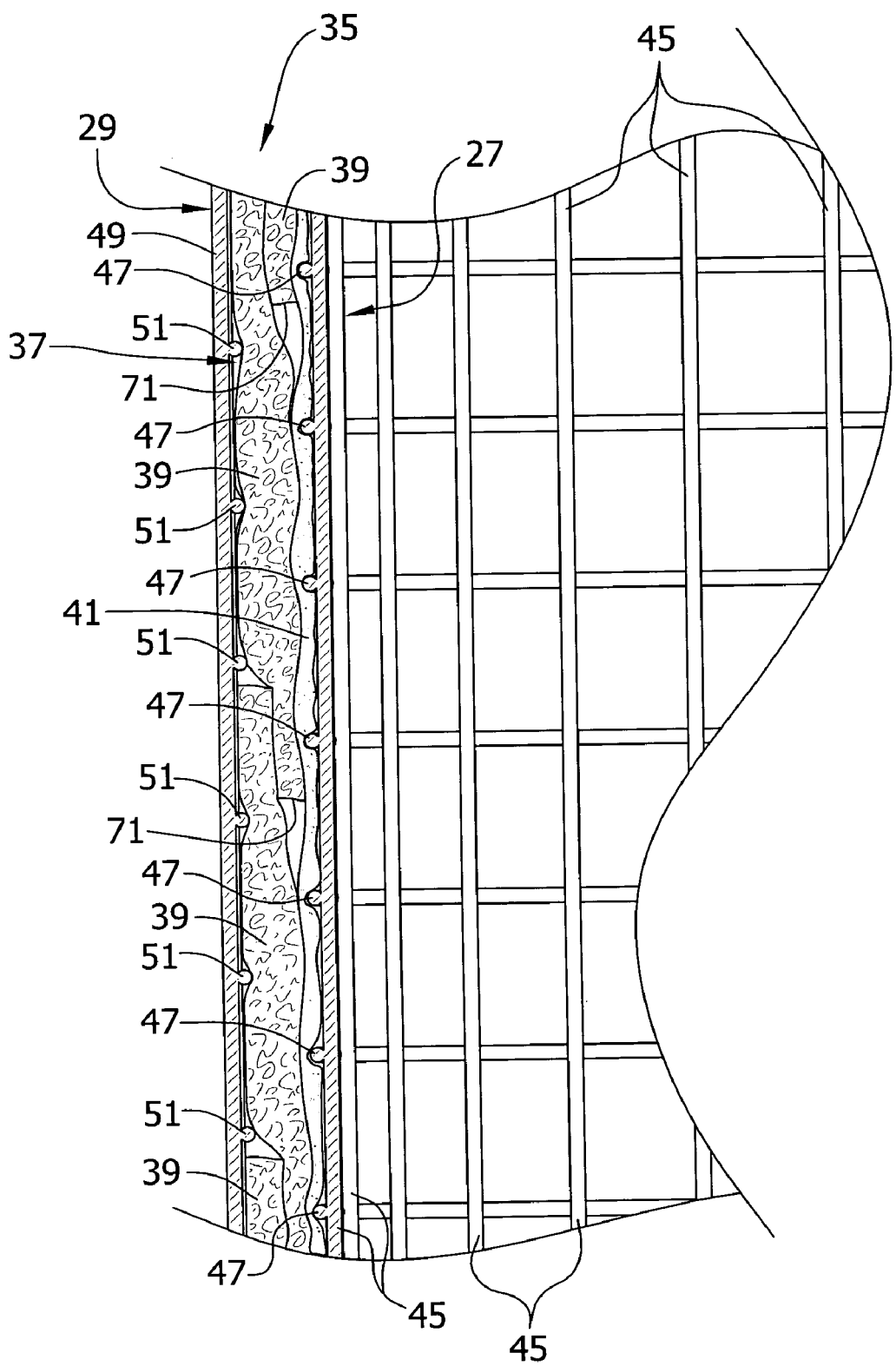
FIG. 3 is an enlarged, fragmentary vertical section of the fiber bed assembly of FIG. 2.
Figure 4:
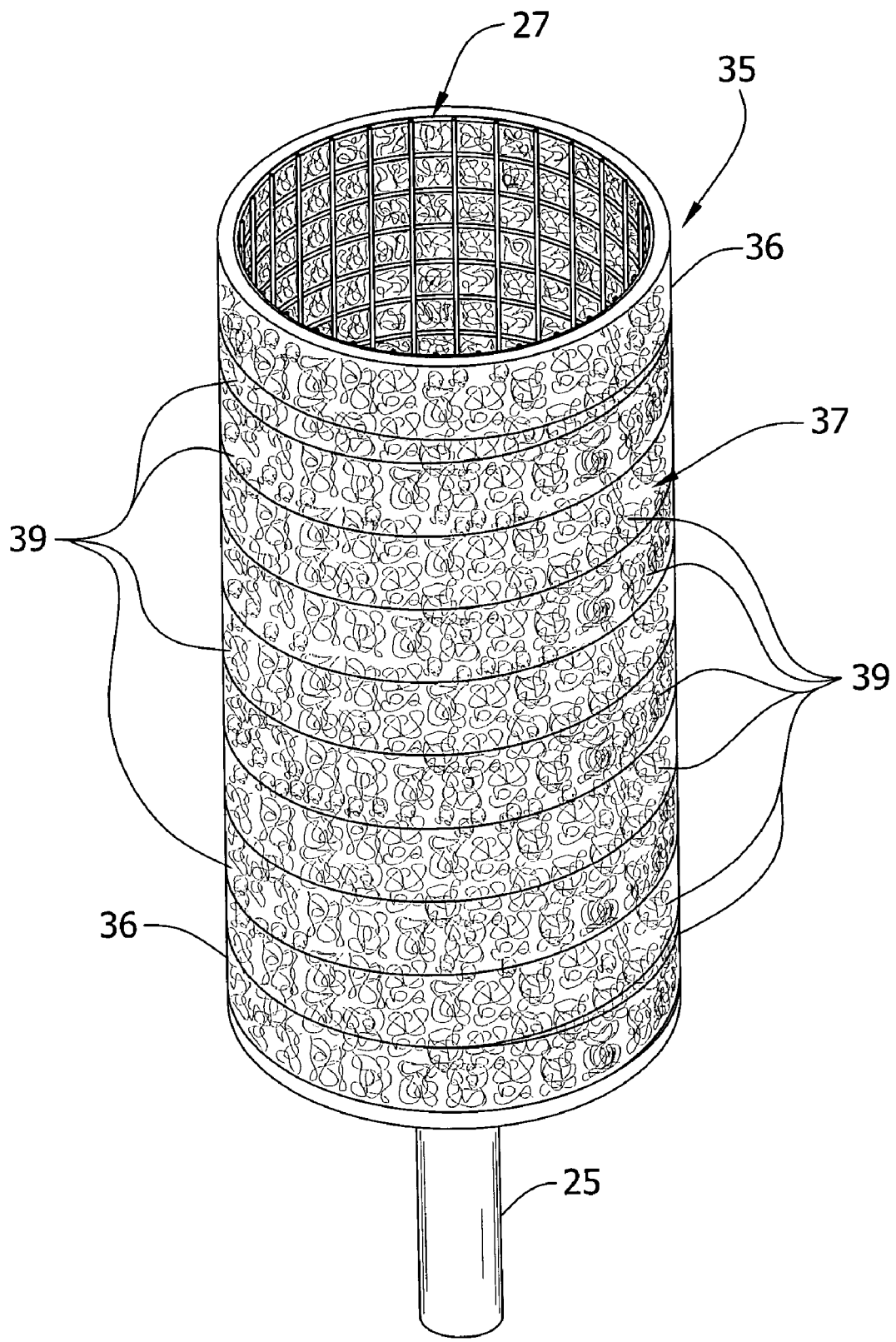
FIG. 4 is an enlarged perspective of the fiber bed assembly with an outer screen removed to show a fiber bed of the fiber bed assembly.

Referring now also to FIGS. 2-4, fiber bed assembly 19 of the forward flow mist eliminator 1 includes a drain leg 25 that is spaced above the bottom of the tank 3. The drain leg 25 comprises a drain tube 25A, a circular bottom plate 25B, and a passage 25C extending through the drain tube and opening at the bottom plate. The passage 25C opens into the tank 3 for draining collected liquids and particles removed from the gas stream by the fiber bed assembly 19. The liquid and wetted or dissolved soluble solids collected in the bottom of the tank 3 are drained through drain pipe 21. An inner screen and an outer screen (generally indicated at 27 and 29, respectively) extend up from the bottom plate 25B to the mounting plate 7 and are concentrically arranged in radially spaced relation. Collectively, the inner and outer screens 27, 29 constitute a wall in the illustrated embodiment that separates an interior (downstream) space 31 within the inner screen 27 from an exterior (upstream) space 33 within the tank 3 but outside the inner screen 27. It will be understood that the wall may be constructed in other ways (e.g., having only a single screen or no screen) without departing from the scope of the present invention. The inner and outer screens 27, 29 are of a generally mesh construction so that they each define relatively large openings that would permit the gas stream to move generally freely though the inner and outer screens between the interior space 31 and the exterior space 33. The screens 27, 29 are connected to an annular flange 34 which is disposed on the top side of the annular mounting plate 7. The annular flange 34 is attached to the mounting plate 7 and supports the screens 27, 29 and drain leg 25. In the illustrated embodiment, the inner screen 27, outer screen 29 and annular flange 34 comprise a fiber bed support. It is to be understood that other constructions for supporting a fiber bed may be used without departing from the scope of the present invention.

A fiber bed (generally indicated at 35) of the fiber bed assembly 19 is located in the radial space between the inner and outer screens 27, 29 and substantially fills the space and covers the openings in the screens so that the gas stream must pass through the fiber bed to move from the exterior space 33 surrounding the fiber bed assembly to the interior space 31 within the fiber bed assembly (see FIG. 1). The fiber bed 35 is generally tubular in shape and operatively sealed at opposite ends to the mounting plate 7 and to the bottom plate 25B of the drain leg 25 in a way known to those of ordinary skill in the art so that gas does not bypass the fiber bed in flowing from the exterior space 33 in the tank 3 to the interior space 31. An elongate, generally flat fiber bed collecting media strip, generally indicated at 37, is used to form part of the fiber bed 35. As best seen in FIG. 4, the fiber bed collecting media strip 37 (or "pocket strip filter") is wound in a spiral around the inner screen 27. The ends of the fiber bed collecting media strip 37 taper in width substantially to a point. An edge 38 of the taper (see FIG. 6B) is positioned to extend circumferentially at one end of the inner screen 27 and thereby sets the angle of the spiral. The wrapping is carried out so that adjacent turns 39 of the fiber bed collecting media strip 37 overlap each other. Additional pieces 36 of the fiber bed collecting media strip 37 may be applied at the ends of the fiber bed 35 or elsewhere as needed to form a continuous fiber bed surface completely covering the inner screen 27. For example, the additional pieces 36 of the fiber bed collecting media strip can be wrapped in a circle (rather than a spiral) next to the ends of the inner and outer screens 27, 29 to fully cover the ends. Glass roving (not shown) may also be used at the ends of the fiber bed 35 to assure sufficient gas sealing. It will be understood that a fiber bed may be formed other than by a spiral wrap within the scope of the present invention. For example, a fiber bed could be formed by a cylindrical tube of the fiber bed collecting media strip having a width equal to the height of the inner and outer screens 27, 29.

A drainage layer 41 located between the wrapped fiber bed collecting media strip 37 and the inner screen 27 (FIG. 3) receives liquid and wetted or dissolved soluble solids from fiber bed collecting media strip and transports them to the bottom of the fiber bed 35 for draining out through passage 25C in drain tube 25A into the tank 3 (FIG. 1). The drainage layer 41 covers the entire exterior surface of the inner screen 27. Any suitable material that drains freely while also permitting gas to pass through it may be used for the drainage layer 41. In the illustrated embodiment, drainage layer 41 may be like the drainage layers disclosed is co-assigned U.S. Pat. Nos. 4,086,070 and 4,249,918, the disclosures of which are incorporated herein by reference.

The outer screen 29 is applied over the wrapped fiber bed collecting media strip 37 on the inner screen 27, and compresses the wrap to seal the joints between adjacent, overlapping turns 39 of the fiber bed collecting media strip, as shown in FIG. 3. Each of the inner and outer screens 27, 29 are formed by an array of vertical wires (45 and 49, respectively) and horizontal wires (47 and 51, respectively) that are joined together where they overlap each other. The horizontal wires 47 of the inner screen 27 are located on the exteriors of the vertical wires 45 of the inner screen. The horizontal wires 51 of the outer screen 29 are located on the interiors of the vertical wires 49 of the outer screen. The locations of the horizontal wires of the inner screen 27 and outer screen 29 are configured so that, as the inner and outer screens are arranged in the fiber bed assembly 19, the horizontal wires 47 of the inner screen are vertically offset from the horizontal wires 51 of the outer screen. The horizontal wires 47, 51 therefore do not form pinch points that could decrease the functionality of the fiber bed 35. The alternating arrangement of the horizontal wires 47, 51 forces the fiber bed 35 into a somewhat undulating configuration that acts to grip the fiber bed and hold it in securely in position and particularly against movement axially of the fiber bed. FIG. 3 is drawn to illustrate the fiber bed 35 in its actual condition between the inner and outer screens 27, 29. The outer screen 29 compresses the fiber bed 35 against the inner screen 27 to stabilize the fiber bed and seal between adjacent turns 39 of the fiber bed collecting media strip 37. Other similar views (FIGS. 7-11) illustrate the fiber bed schematically (as it might appear prior to compression by the outer screen 29).

Figure 5A:
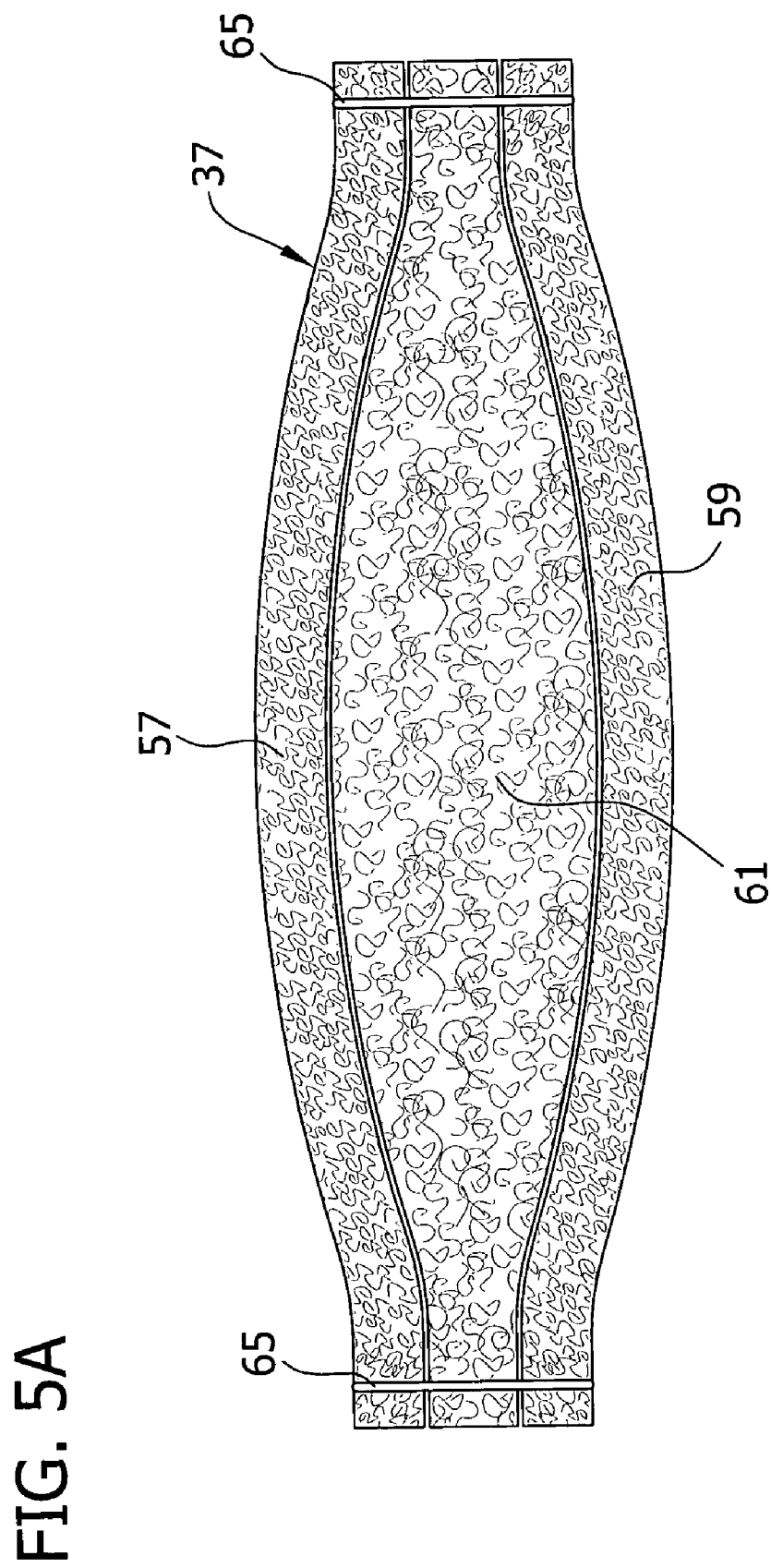
FIG. 5A is a cross section of a fiber bed collecting media strip used to form the fiber bed.

The fiber bed collecting media strip 37 preferably has a composite structure including an inner layer 57, and outer layer 59 and an intermediate layer 61 sandwiched between the inner and outer layers (FIG. 5A). The inner and outer layers 57, 59 are formed of a fibrous material which exhibits good strength characteristics, but may be less efficient in removing aerosols and/or wetted soluble solids from the gas stream. The intermediate layer 61 is also formed of a fibrous material that is highly efficient in removing aerosols and/or wetted soluble solids from the gas stream, but has lesser strength than the inner and outer layers 57, 59. For example, the inner and outer layers can be needle punched, while the intermediate layer 61 is not needle punched. Thus, the intermediate layer 61 is free of any discontinuities (such as may be caused by needle punching) that could provide a flow path for the gas stream to bypass the fibers in the layer. The inner and outer layers 57, 59 can be made of any suitable fibrous material, such as ECOMAT 300 needle punched nonwoven glass fiber mat available in this country from Johns Manville Corporation of Denver, Colo. Other materials are possible, such as ECOMAT 180 scrim reinforced glass fiber mats available from Johns Manville. The ECOMAT 180 mats are thinner than the ECOMAT 300 mats for a more compact fiber bed 35. The intermediate material can be, for example, JM B015 glass fiber mat, also available from Johns Manville Corporation. The JM B015 mat is a nonwoven, meltblown glass fiber batting. Depending upon the particular application, the intermediate layer may be formed by multiple glass fiber mats.

The fibers in the inner and outer layers 57, 59 of the fiber bed collecting media strip 37 may have, for example, average diameters of about 6 to 8 microns or more. The fibers in the intermediate layer are preferably smaller, such as about 5 microns or less in average diameter. More preferably, the fibers in the intermediate layer 61 have an average diameter of about 4 microns or less. However, it is to be understood that fibers in the intermediate layer 61 which have the same or greater average diameter than fibers forming the inner and outer layers 57, 59 may be used within the scope of the present invention. Preferably the fibers used are long staple fibers (e.g., 0.25 inches to 6 inches or 0.6 cm to 15 cm) that are not chemically bonded. Instead, the fibers are sufficiently entangled or fixed to form a stable bed when mounted on the mist eliminator. The fibers should be durable under process conditions and preferably are not chemically bonded together. Glass fibers are desirable in certain highly corrosive environments, such as where the gas stream contains sulphuric acid. However, the fibers may be polymeric or other material suitable for particular applications. When used in a chemically compatible process, the fibers of the intermediate layer 61 may be treated so that they are resistant to wetting by the aerosol in the gas stream. The inner and outer layers 57, 59 may also be treated to be resistant to wetting by the aerosol. The anti-wetting treatment of the inner and outer layers 57, 59 and the intermediate layer 61 further facilitates removal of the aerosol from the gas stream by keeping these layers from holding the aerosol (and wetted or dissolved soluble solids) once it is removed from the gas stream. The drainage layer 41 is preferably formed or treated to be wettable.

In another embodiment (not shown), the intermediate layer 61 is formed by longer fibers having a larger diameter, and shorter, smaller diameter fibers are interspersed within the larger fibers. For instance, the smaller fibers may have an average diameter of about 3 microns or less. In one instance, the smaller fibers have an average diameter of between about 0.01 microns and 3 microns. The smaller fibers are believed to assist in holding the larger fibers apart to preserve void spaces within the intermediate layer 61, even under compression.

As shown in FIG. 5A, the inner and outer layers 57, 59 are connected together by stitching 65 along opposite longitudinal edge margins of the inner and outer layers. The stitching 65 also extends through the intermediate layer 61 at the longitudinal edge margins. In the illustrated embodiment, the stitching 65 is formed with polytetrafluoroethylene coated thread for resistance to the corrosive aerosol in the gas stream, but other materials may be used. Moreover, other ways of joining inner layer 57, outer layer 59 and intermediate layer 61 together may be used within the scope of the present invention. For instance, the layers may be joined by stapling, heat fusing and gluing, or in another suitable manner (not shown). Moreover, there may be stitching or other interconnection along only one longitudinal edge margin within the scope of the present invention. It is also envisioned that the inner layer, outer layer and intermediate layer may be arranged as shown in FIG. 5A, but without any fixed connection among the layers. Still further, a fiber bed collecting media (not shown) may be formed by laying down fibers forming the equivalent of an intermediate layer in terms of its ability to remove aerosols and/or wetted soluble solids from a gas stream directly onto a layer of needle punched or otherwise reinforced material (e.g., like the outer or inner layer). For example, glass meltblown fibers laid directly onto the glass fibers of a reinforced layer can fuse with the reinforced layer so as to become permanently attached and supported by the reinforced layer. In that event, either the inner or outer layer would not necessarily be present in the fiber bed collecting media strip. In yet another version of the collecting media strip (not shown), at least one of the inner and outer layers may be replaced by glass scrim.

Figure 5B:
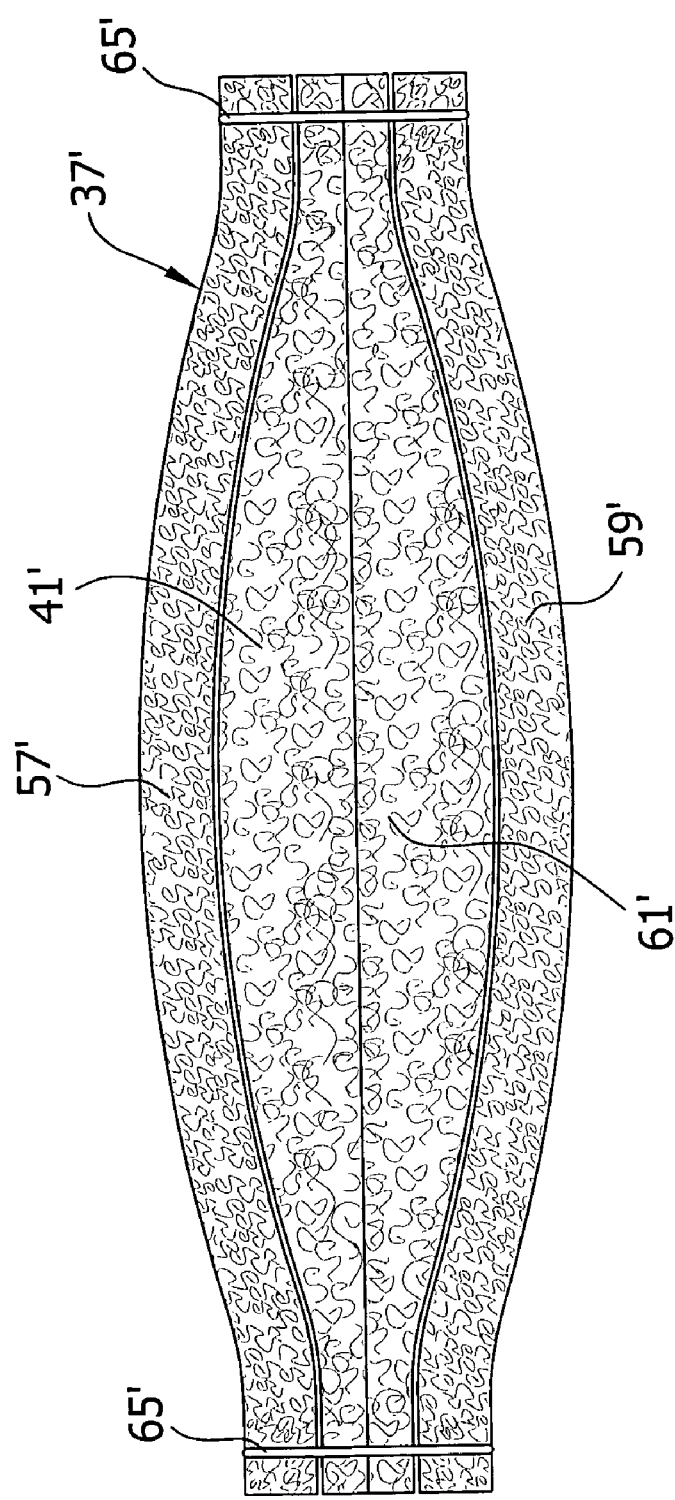
FIG. 5B is a cross section of a modified fiber bed collecting media strip.

FIGS. 5B and 5C illustrate two possible variations in the construction of the fiber bed collecting media strip, which are designated generally at 37' and 37", respectively. The fiber bed collecting media strip 37' incorporates a drainage layer 41' between the inner and outer layers 57', 59' of the media. More specifically, the drainage layer 41' is located between the intermediate layer 61' and the inner layer 57' for use in the forward flow mist eliminator. The fiber bed collecting media strip 37' may be used with or without another drainage layer (not shown) covering the inner screen 27. The second variant of the fiber bed collecting media strip 37" shown in FIG. 5C may have the same construction as the fiber bed collection media 37, 37' shown in FIG. 5A or FIG. 5B. In FIG. 5C, the collecting media strip 37" has been pleated to increase the surface area of the colleting media. Formed wire screens 40" are used to hold the media 37" in the pleated configuration.

In the illustrated embodiment, the thickness of the fiber bed collecting media strip 37 can be different for different applications and different acceptable efficiencies. However, in one embodiment employing the ECOMAT 300 mats and three JM B005 mats, the fiber bed collecting media strip 37 has an uncompressed thickness of about 1 inch (3 cm). As compressed between the inner and outer screens 27, 29, the thickness is about 0.5 inches (1 cm). In another embodiment employing the ECOMAT 180 and a single JM B005 mat, the fiber bed collecting media strip has an uncompressed thickness of about 0.5 inches (1 cm). As compressed between the inner and outer screens 27, 29, the thickness is about 0.25 inches (0.6 cm). For a height of the fiber bed 35 of 6 feet (1.8 m) and a compressed fiber bed thickness of 0.5 inches (1 cm), the diameter of the inner screen 27 can be such that the fiber bed 35 has more total flow area compared to glass roving beds, even though the envelope in which the fiber bed assembly 19 is received is unchanged. The larger flow area increases the capacity of the fiber bed assembly 19 without increasing its overall size.

As stated previously, the fiber bed collecting media strip 37 is applied to the inner screen 27 by wrapping the strip in a spiral from one end of the screen to the other. Non-spiral end treatments (e.g., additional pieces 36 and/or cylindrical rovings) are also preferably used in combination with the spiral wrap. The fiber bed collecting media strip 37 is wrapped so that each turn 39 of the spiral overlaps the previous turn. As may be seen in FIG. 3, a portion of each lower turn 39 in the wrap overlies the turn immediately above it. In the illustrated embodiment, the width of the fiber bed collecting media strip 37 is about 18 inches (46 cm) but other widths (e.g., 24 inches or 61 cm) may be employed without departing from the scope of the present invention including a width equal to the height of the inner screen 27. In that case, the fiber bed collecting media strip would not be wound in a spiral, but formed as a tube to fit over the screen. Where a narrower fiber bed collecting media strip and a spiral wind are used as in the illustrated embodiment, each turn 39 overlaps the prior turn by about 2 to 6 inches (6 to 15 cm) and more preferably by about 2 to 3 inches (6 to 8 cm). The overlap is selected so that there is a sufficient surface contact to inhibit gas from flowing between the turns 39 without passing through the fiber bed material (i.e., "gas bypassing"). The precise distance of overlap can be other than described herein without departing from the scope of the present invention. It is also envisioned that no overlap may be employed. The fiber bed collecting media strip 37 is schematically illustrated as a unitary piece in FIG. 3 for simplicity of illustration. However, the fiber bed collecting media strip preferably has the composite configuration shown in FIG. 5. Still further, multiple strips (non shown) may be used to form the spiral wrap.

Figure 6A:
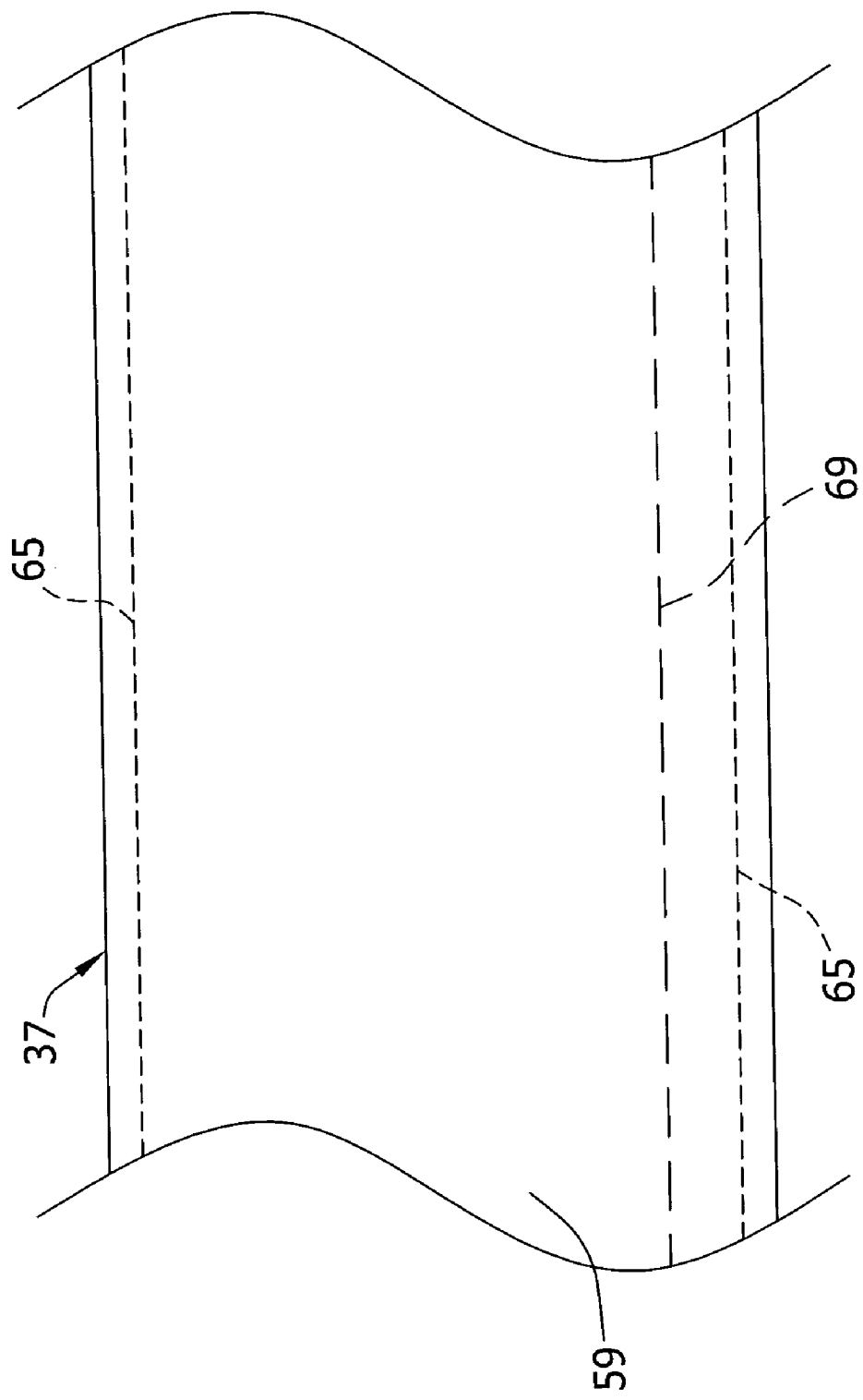
FIG. 6A is a fragmentary elevation of a flat side of the fiber bed collecting media strip.
Figure 6B:
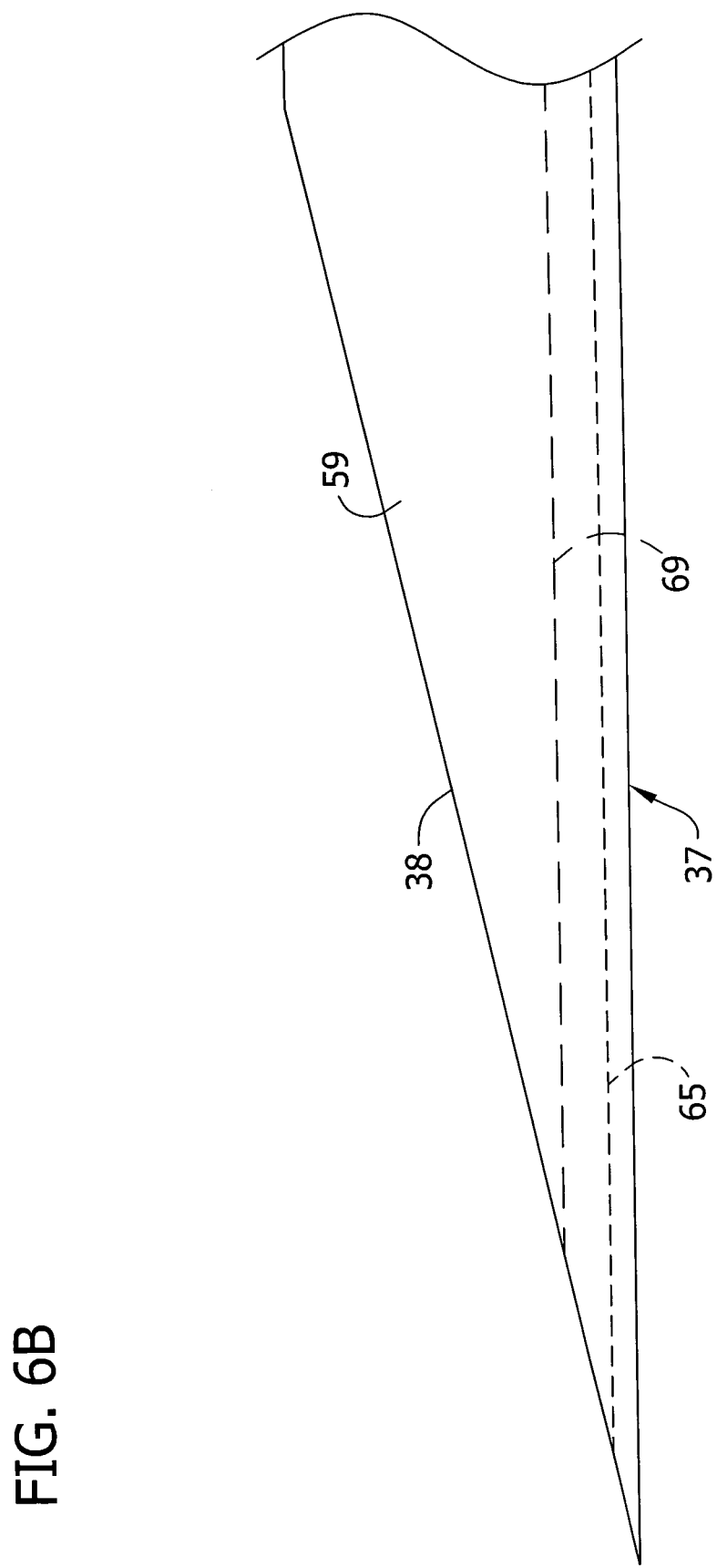
FIG. 6B is a fragmentary elevation of a tapered end of the fiber bed collecting media strip.

In one version of the fiber bed collecting media strip 37 shown in FIG. 6A, the element is marked on its outer layer 59 with a dashed line 69 to show where to place the edge of the adjacent turn 39 when spirally wrapping the element on the inner screen 27. The presence of the line 69 allows relatively unskilled labor to be used to form the fiber bed 35 using the fiber bed collecting media strip 37. For example when the fiber bed 35 needs to be replaced, the fiber bed assembly 19 does not have to be sent to a remote installation for refurbishing and it may not be necessary to have a second fiber bed assembly ready for installation while the first is being refurbished. Wrapping of the fiber bed collecting media strip 37 can be carried out with little or no tension applied to the fiber bed collecting media strip. The overlap in combination with the pressure applied to the fiber bed 35 by the inner and outer screens 27, 29 has been found to be sufficient to seal between adjacent turns 39 of the fiber bed collecting media strip 37 in the absence of any significant tension in the fiber bed collecting media strip. Although a dashed line 69 is shown in FIG. 6A, a solid line or other indicia sufficient to show the amount of overlap between adjacent turns 39 of the fiber bed collecting media strip 37 may be used within the scope of the present invention.

Referring again to FIG. 3, the fiber bed collecting media strip 37 is wrapped so that each turn 39 of the element overlaps the turn immediately above it, and a bottom edge of the upper turn spaced away from the material of the lower turn and is exposed to the drainage layer 41 lying directly against the inner screen 27. The exposed bottom edge of the upper turn 39 of the fiber bed collecting media strip 37 defines a drainage overhang 71 that allows liquids to flow out of the upper turn 39 and migrate directly to the drainage layer 41 without obstruction. It will be appreciated that gravity causes the liquids removed from the gas stream to move within the fiber bed collecting media strip 37 toward the bottom of each turn 39. If the collection material of the fiber bed is formed a single piece, or if the bottom edge of each turn of the wrapped fiber bed collecting media strip were in registration with a top edge of the turn immediately below it, the liquid would flow down to the bottom of the fiber bed entirely within the material of the fiber bed collecting media strip. As a result, liquid would tend to accumulate in the turns of the fiber bed collecting media strip at the bottom of the fiber bed because the fiber bed collecting media strip does not readily release the liquid. Accumulated liquid provides a barrier to gas flow through the fiber bed so that not all portions of the fiber bed have about the same pressure drop (i.e., resistance to flow of gas through the fiber bed), reducing the effective useable area of the fiber bed and hence reducing the capacity of the fiber bed assembly. However, the drainage overhang 71 of the present invention allows liquid to pass from one turn 39 of the fiber bed collecting media strip 37 directly to the drainage layer 41 instead of into the next turn of the fiber bed collecting media strip. In the drainage layer 41, the liquid flows more readily so that none of the turns 39 of the fiber bed collecting media strip 37 tend to accumulate significantly more liquid than others, and the pressure drop across the fiber bed 35 is substantially uniform from top to bottom.

Figure 7:
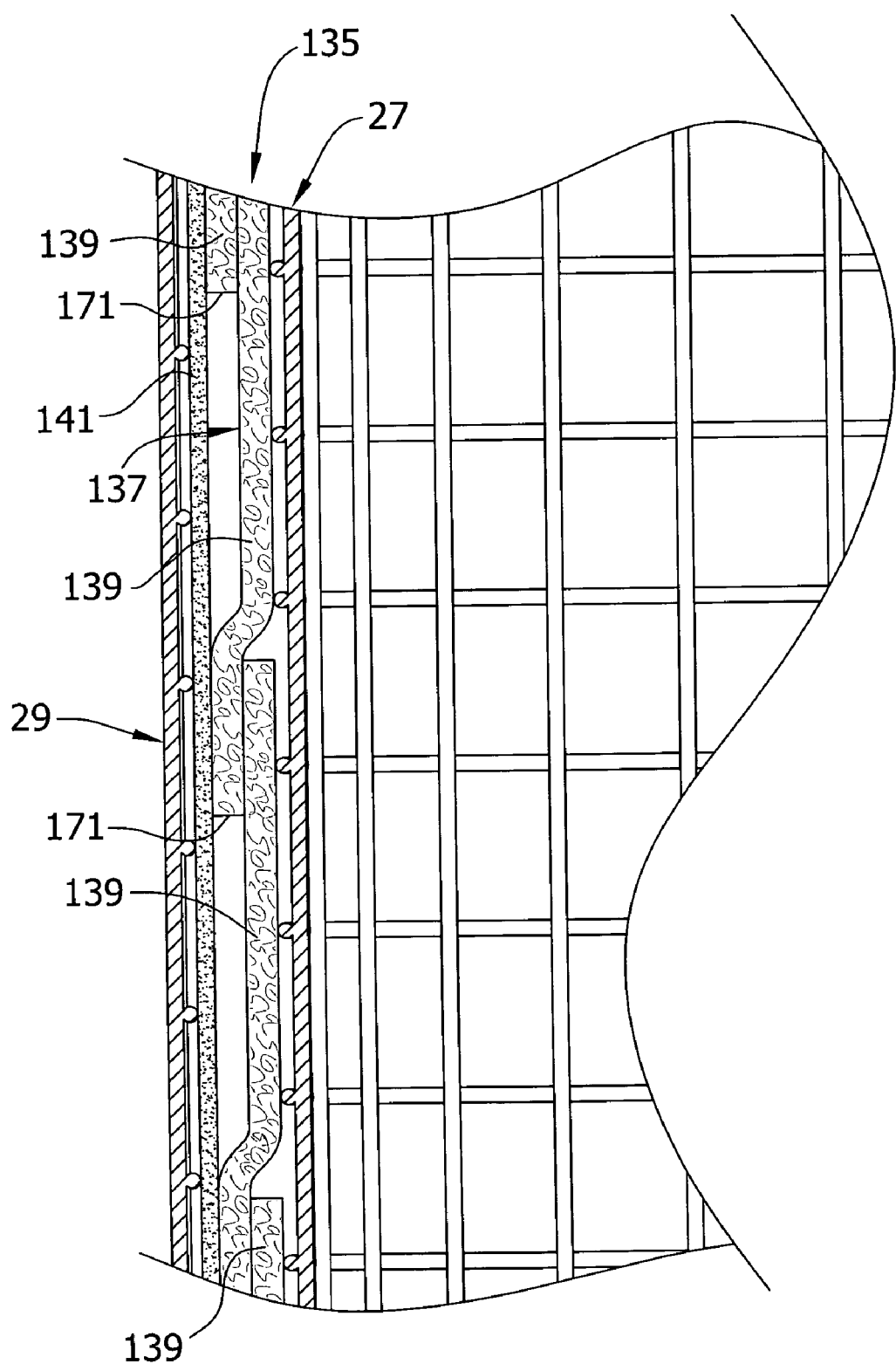
FIG. 7 is an enlarged, fragmentary vertical section of a fiber bed assembly similar to FIG. 3 but showing a first modified fiber bed for use with a reverse flow mist eliminator.

A first modified fiber bed 135 for a reverse flow mist eliminator is schematically illustrated in FIG. 7 in fragmentary cross section similar to FIG. 3. The reconfigured parts of the modified fiber bed 135 will be given the same reference number as the corresponding parts of the fiber bed 35, plus "100". As stated previously herein, in a reverse flow mist eliminator the gas stream flows from within the inner screen 27 radially outwardly through the fiber bed 135 past the outer screen 29. The construction of the fiber bed 135 is similar to the fiber bed 35 of a standard flow mist eliminator 1 (as shown in FIG. 3) except as noted. The drainage layer 141 is located against the inside of the outer screen 29 rather than against the inner screen 27. The fiber bed collecting media strip 137 is wound in a spiral as before, but the wrapping is carried out so that each turn 139 overlaps the turn immediately below it, forming a drainage overhang 171 that is exposed directly to the drainage layer 141 on the outer screen 29. The operation and advantages of the drainage overhang 171 are the same as for the drainage overhang 71 the standard flow mist eliminator 1.

Figure 8:
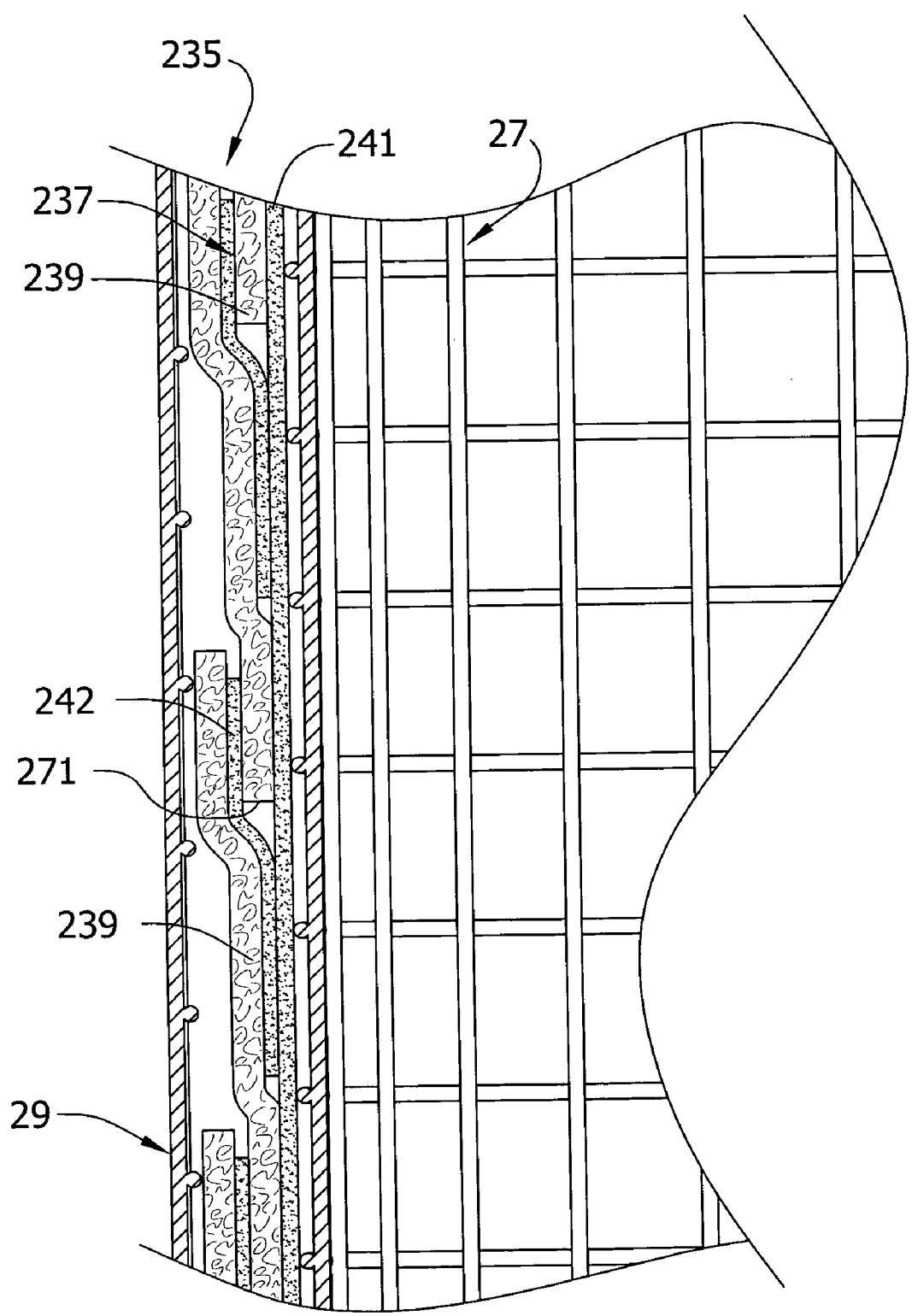
FIG. 8 is an enlarged, fragmentary vertical section of a fiber bed assembly similar to FIG. 3 but showing a second modified fiber bed.

A second modified version of the standard flow fiber bed schematically illustrated in FIG. 8 is generally similar in construction to the fiber bed assembly 19 shown in FIG. 3. The reconfigured parts of the modified fiber bed 235 will be given the same reference number as the corresponding parts of the fiber bed 35, plus "200". In addition to a master drainage layer 241 similar to the drainage layer 41, a drainage strip 242 (broadly, "an intermediate drainage layer") is spirally wound along with the fiber bed collecting media strip 237 so that the drainage strips are disposed between adjacent turns 239 of the fiber bed collecting media strip where they overlap. The material of the drainage strip 242 can be the same as the master drainage layer 241. The drainage strip 242 extends outward from the overlap and against the drainage layer 241 extending substantially the full height of the fiber bed 235. In so doing, the drainage strip 242 extends under the drainage overhang 271 formed by a bottom edge of the upper turn 239 of fiber bed collecting media strip 237 and is interposed everywhere between the drainage overhang and the next lower turn of the fiber bed collecting media strip. Liquid draining out of the upper turn 239 at the drainage overhang 271 that falls straight down hits the drainage strip 242 and is transported in the drainage strip to the drainage layer 241. The drainage strip 242 enhances the ability of the fiber bed 235 to move liquid captured by the fiber bed collecting media strip 237 to the drainage layer 241 by providing a barrier (i.e., the drainage strip 242) between adjacent turns 239 of the fiber bed collecting media strip inhibiting transfer of liquid from one turn to the next. The drainage strip 242 can be wrapped on the inner screen 27 together with the fiber bed collecting media strip 237 to produce the fiber bed illustrated in FIG. 8. The drainage strip 242 may be formed as a single continuous strip (as illustrated) or multiple shorter strips (non shown).

Figure 9:
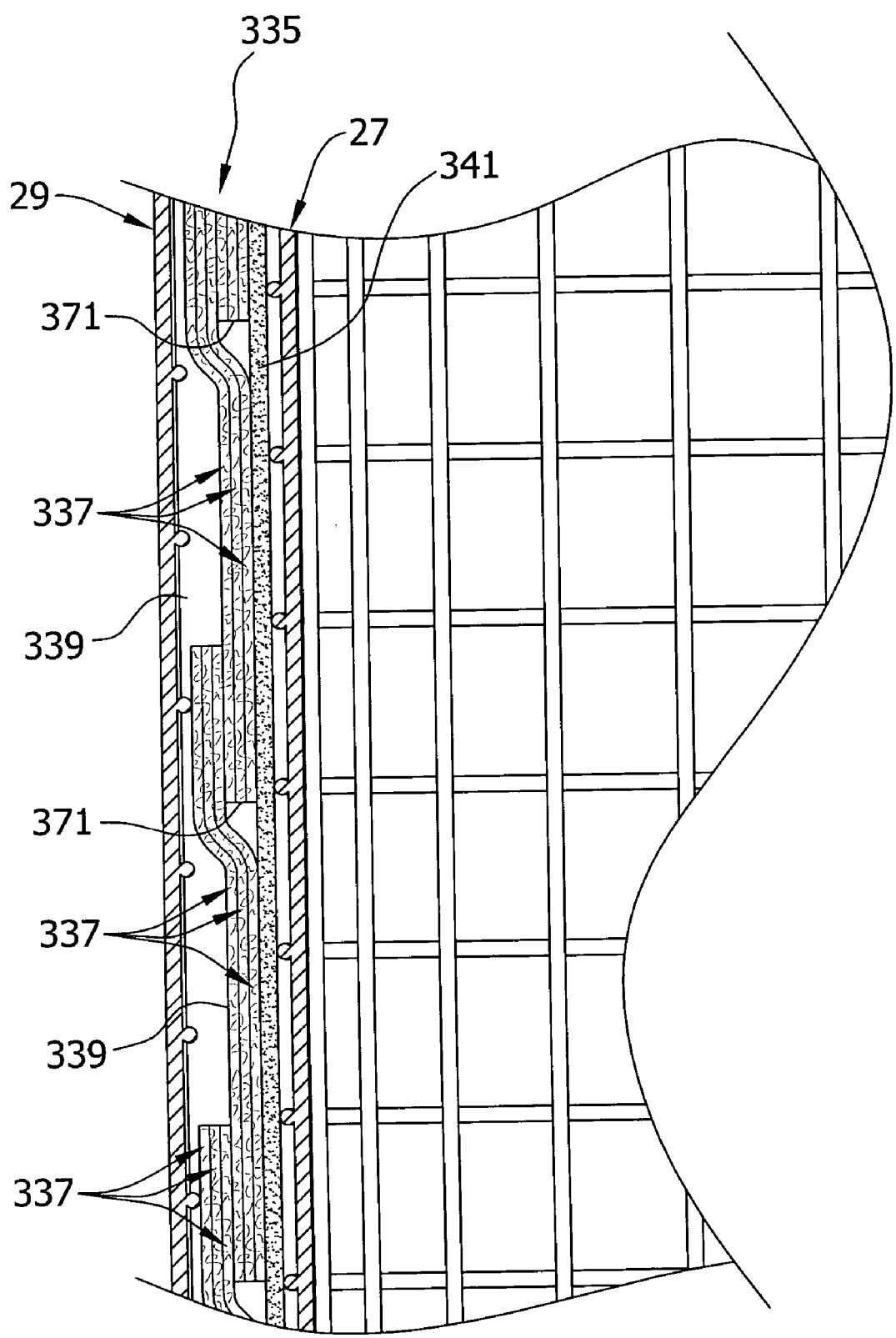
FIG. 9 is an enlarged, fragmentary vertical section of a fiber bed assembly similar to FIG. 3 but showing a third modified fiber bed.

FIG. 9 illustrates a third modified version of the fiber bed 335 in which three fiber bed media 337 are laid on top of each other with their longitudinal edges generally in registration, and then spirally wrapped onto the inner screen 27. The number of fiber bed media arranged in a stack may be other than three within the scope of the present invention. The reconfigured parts of the modified fiber bed 335 will be given the same reference number as the corresponding parts of the fiber bed 35, plus "300". Wrapping the overlaid fiber bed media 337 onto the inner screen 27 can otherwise be carried out in the same way as for the single layer fiber bed collecting media strip 37. Fiber bed collecting media strip 337 may have the same construction as the fiber bed collecting media strip 37 shown in FIG. 5, or other construction suitable for removing aerosols and/or wetted soluble solids from a gas stream.

Figure 10:
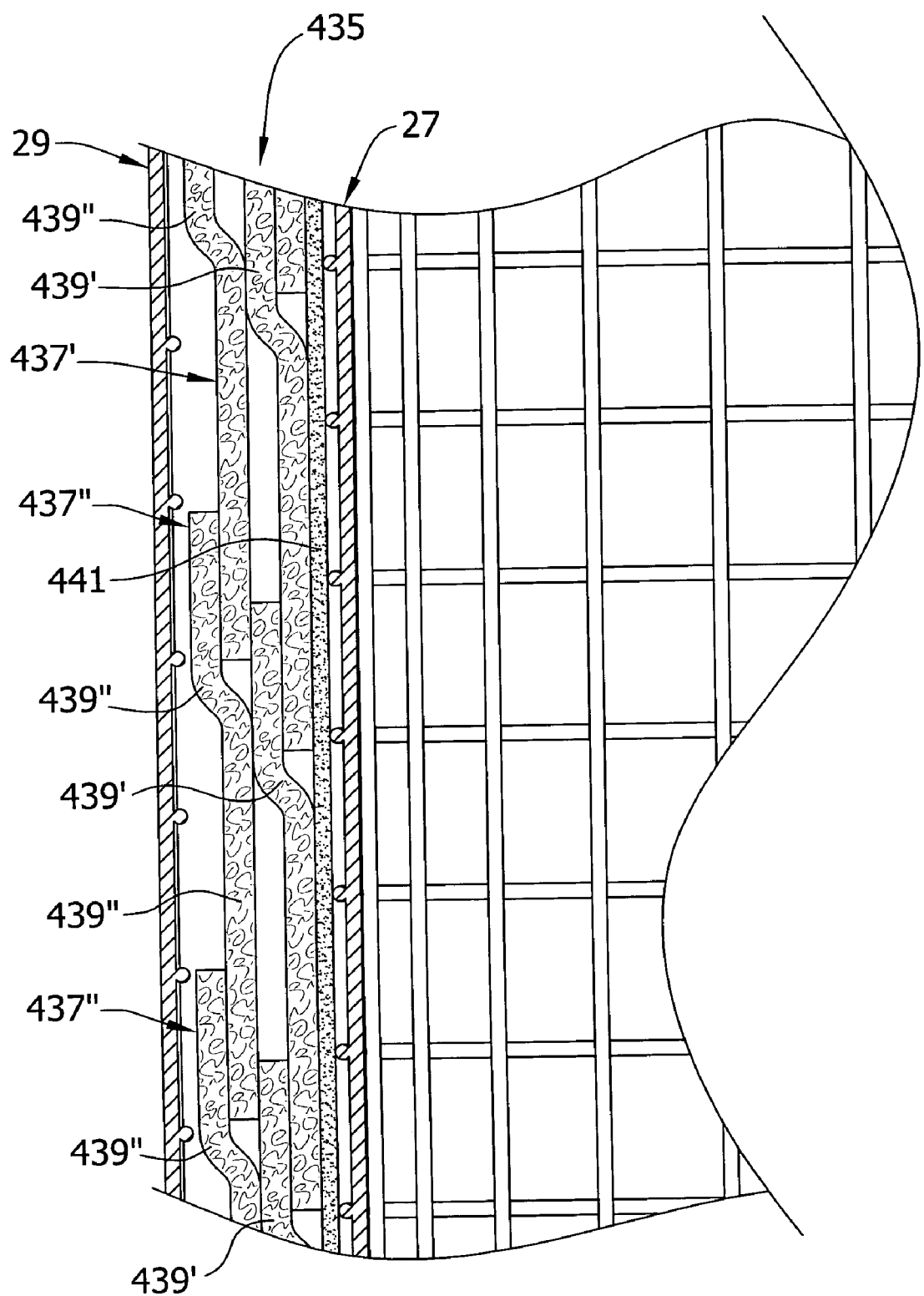
FIG. 10 is an enlarged, fragmentary vertical section of a fiber bed assembly similar to FIG. 3 but showing a fourth modified fiber bed.

A fourth modified version of the fiber bed 435 is shown in FIG. 10 to comprise two spirally wound wrappings layered one on top of the other on the inner screen 27. The reconfigured parts of the modified fiber bed 435 will be given the same reference number as the corresponding parts of the fiber bed 35, plus "400". Each wrapping is formed by its own fiber bed collecting media strip 437', 437", respectively. Unlike the fiber bed 335 of FIG. 9, the fiber bed collecting media strips 437', 437" are not laid over each other or wrapped in a single operation. The first wrapping can be formed in the same way for the fiber bed of FIG. 3. The fiber bed collecting media strip 437' overlies the drainage layer 441 on the inner screen 27. The second wrapping is formed by winding fiber bed collecting media strip 437" on the radially outer surface of the wrapped fiber bed collecting media strip 437'. It is to be understood that the number of wrappings may be more than two without departing from the scope of the present invention. Moreover another drainage layer (not shown) may be positioned between the wrappings. One advantage of layered fiber bed constructions of FIGS. 9 and 10 is that fiber beds for different applications can be formed with the same basic material (e.g., the fiber bed collecting media strip 37). Selecting the number of layers tailors the construction of the fiber bed for the particular job to be performed.

Figure 11:
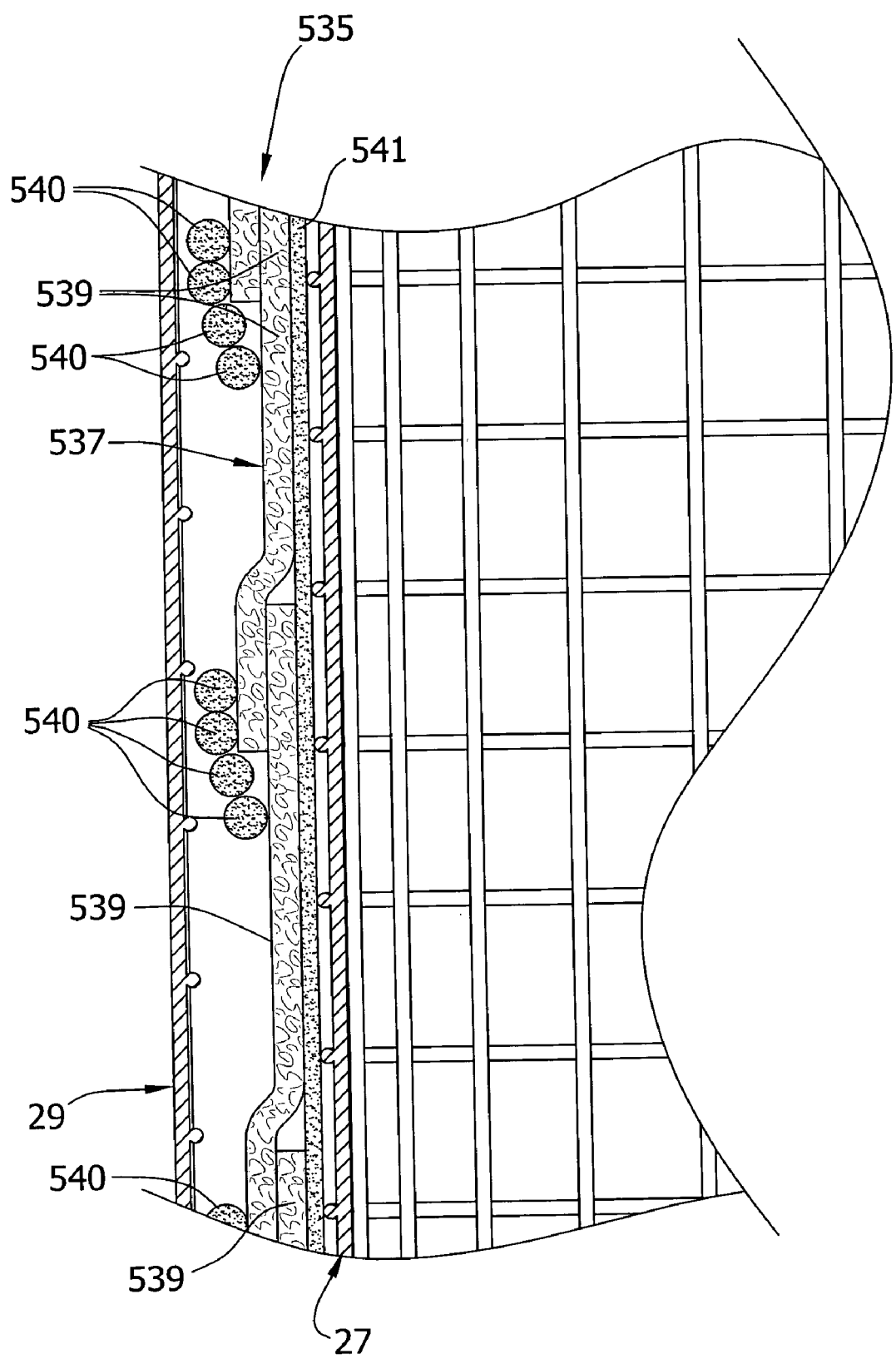
FIG. 11 is an enlarged, fragmentary vertical section of a fiber bed assembly similar to FIG. 3 but showing a fifth modified fiber bed.

The fifth modified version of the fiber bed 535 shown in FIG. 11. Parts of the fiber bed 535 corresponding to the fiber bed 35 are given the same reference numeral, plus "500". The fiber bed 535 is constructed with additional material at the seams where the adjacent turns 539 of the spirally wound fiber bed collecting media strip 537 overlap. It is believed that if gas bypassing were to occur, these overlap seams would be the most likely location. Accordingly, multiple strands 540 of a roving made of fiberglass or other suitable material are wound onto the radially exterior surface of the spirally wound fiber bed collecting media strip 537 over the seams to further seal the fiber bed 535 at the seams. It is also possible that the roving 540 could be wrapped onto the inner screen 27 and the fiber bed collecting media strip 537 wrapped over it so that the overlap seams are in registration with the wrapped bands of roving. Another possible option is to apply caulk (not shown) or other suitable sealant over the seams. Preferably, any such sealing structure should present as little obstruction to the flow of gas through the fiber bed 535 as possible.

Figure 12:
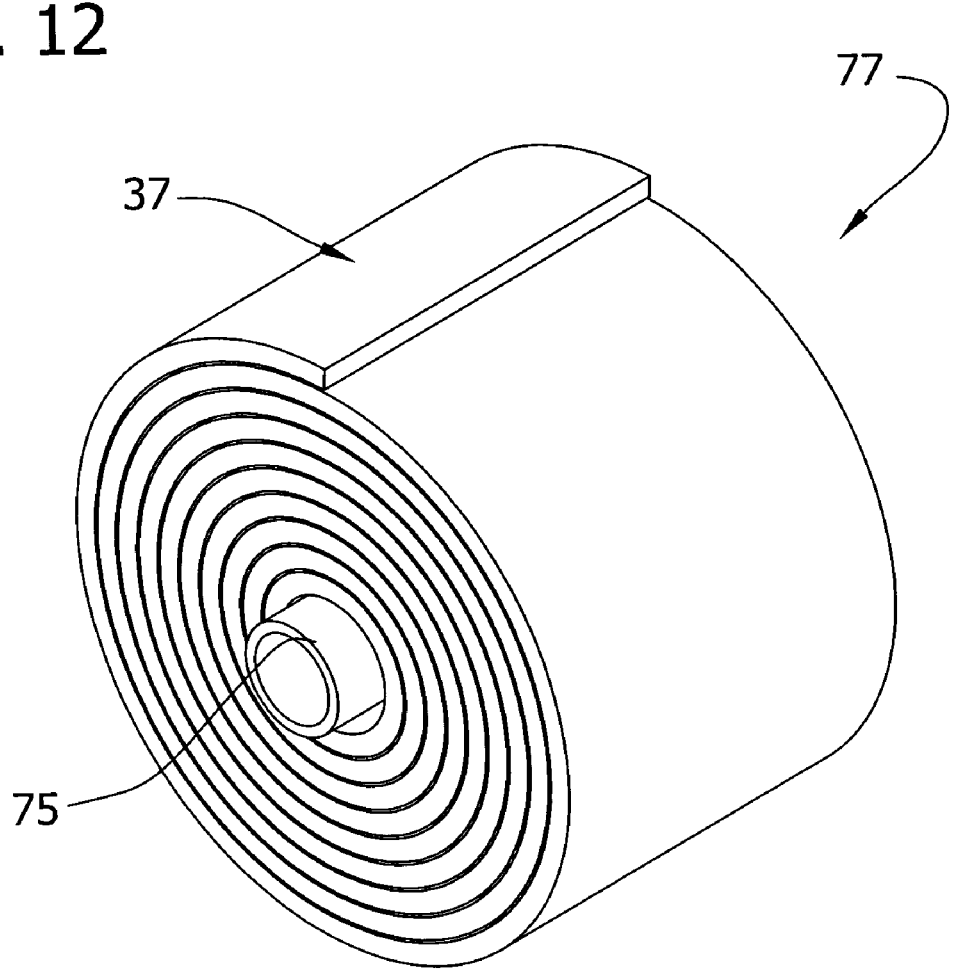
FIG. 12 is a perspective of a roll of the fiber bed collecting media strip.
Figure 13:
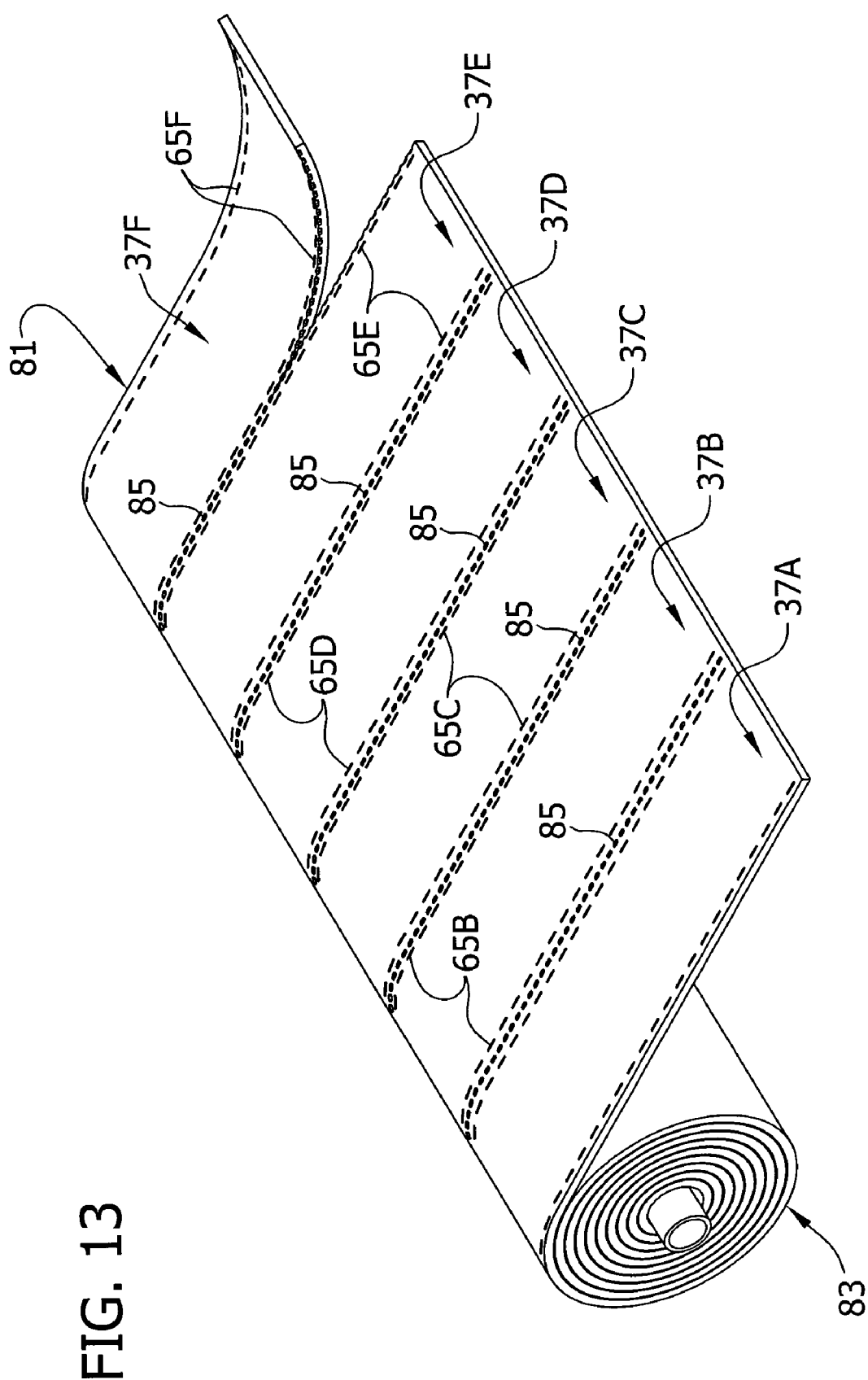
FIG. 13 is a fragmentary perspective of a roll of a sheet of multiple fiber bed media joined together.

The fiber bed collecting media strip 37 of the present invention can be used in the field and may be packaged in formats suitable for shipment to and use in the field. For example as shown in FIG. 12, fiber bed collecting media strip 37 formed such as shown in FIG. 3 can be wound onto a spindle 75 forming a roll (generally indicated at 77) for shipment. When needed, the fiber bed collecting media strip 37 can be let out from the roll 77 to wind onto an inner screen 27 of a fiber bed assembly 19. Another format shown in FIG. 13 has a single sheet of fiber bed material (generally indicated at 81) containing multiple (six) fiber bed collecting media strips 37A-37F arranged side-by-side and joined together. The fiber bed material can be packaged on a roll indicated generally at 83. The fiber bed material can be formed with an inner layer similar to inner layer 57 but extending the full width of the fiber bed material 81, an outer layer similar to outer layer 59 but extending the full width of the sheet 81 and an intermediate layer similar to intermediate layer 61 but extending the full width of the sheet. An intermediate layer could also be separated into sections prior to assembly with the inner and outer layers. Stitching 65A-65F formed by sewing or other suitable means can be formed along the edges of each individual fiber bed collecting media strips 37A-37F to unitize the components (i.e., an inner layer section, an outer layer section and an intermediate layer section) of each individual element. However, it is envisioned that the stitching 65A-65F could be omitted. Lines 85 of perforations between adjacent fiber bed collection media 37A-37F form frangible portions that permit the connected strips 37A-37F to be torn apart for individual use. Other ways of weakening the attachment between adjacent strips 37A-37F can be employed. Moreover, no lines of weakness could be preformed in the fiber bed material. Instead a cutting tool (not shown) could be used to separate the fiber bed collection media when needed. However, it is preferred to have the width of each fiber bed collection media established prior to shipment to the field.

A prototype fiber bed assembly 19 constructed according to the principles of the present invention was tested and its performance is compared to that of an existing fiber bed assembly. The results of the tests for the existing fiber bed assembly are tabulated in FIG. 14A of the drawings and test results for the prototype fiber bed assembly 19 are tabulated in FIG. 14B. The existing fiber bed assembly is a glass roving pack fiber bed assembly commercially available from Monsanto Enviro-Chem Systems, Inc. of St. Louis, Mo. The glass roving fiber bed assembly is formed by wrapping a fiber roving on a cylindrical screen.

The prototype fiber bed assembly 19 is formed by wrapping the fiber bed collecting media strip on the inner screen 27 to produce a fiber bed 135 substantially as shown in FIG. 7 (i.e., for reverse flow). The fiber bed collecting media strip tested has the construction shown in FIG. 5, except that the intermediate layer is formed by three JM B005 mats arranged in layers, and the inner and outer layers were joined together by stapling, rather than stitching. The inner and outer layers are ECOMAT 300 fiber mats, as described for the illustrated embodiment above. The overlap between adjacent turns 39 of the fiber bed collecting media strip in the wrap is about 2 inches (6 cm). A drainage layer similar to FIG. 7 was formed using two fiber mats. The fiber bed collecting media strip is 18 inches (46 cm) wide and 35 feet (10.7 m) long. The outside diameter of the fiber bed 35 is 23.2 inches (58.9 cm), the inside diameter is 22 inches (56 cm), the compressed fiber bed thickness (including the drainage layer) is 0.6 inches (1.5 cm) and the height of the fiber bed is 6 feet (1.8 m). The fiber bed area is 34.5 ft$^2$ (3.21 m$^2$) and the fiber bed volume is 1.8 ft$^3$ (0.05 m$^3$). The total mass of fiber used in the collecting media strip 37 is 10.9 pounds (5.0 kg) and its volume is about 1.5 ft$^3$ (0.04 m$^3$). The overall density of the collecting media strip is 7.4 lb/ft$^3$ (118.5 kg/m$^3$). The overall numbers take into account the areas of overlap in the fiber bed.

The inner and outer layers of the fiber bed collecting media strip formed by the ECOMAT 300 mat are also 35 feet (10.6 m) long and 18 inches (46 cm) wide. The compressed thickness of both layers together is 0.25 inches (0.6 cm). The overall fiber bed area of the layers is 42.5 ft$^2$ (3.95 m$^2$) and the combined volume of the layers is approximately 0.8 ft$^3$. The average fiber diameter of the inner and outer layers is 10.4 microns. The total mass of fiber used is 5.0 lb (2.3 kg) and the overall density of the inner and outer layers is 6.8 lb/ft$^3$ (108.9 kg/m$^3$). The intermediate layer formed by the JM B005 mat is also 35 feet (10.7 m) long and 18 inches (46 cm) wide. The compressed thickness of the intermediate layer is 0.25 inches (0.8 cm). The fiber bed area of the intermediate layer is 42.5 ft$^2$ (3.95 m$^2$) and the volume is approximately 0.8 ft$^3$ (0.02 m$^3$). The total mass of fiber used is 5.9 lb (2.67 kg) and the density of the intermediate layer fiber bed is 7.9 lb/ft$^3$ (126.5 kg/m$^3$)

Referring to the tables in FIGS. 14A and 14B, tests were run for each of the two fiber bed assemblies under four different conditions: low velocity/low load (LVLL); low velocity/high load (LVHL); high velocity/low load (HVLL); and high velocity/high load (HVHL). An additional test for the prototype assembly 19 was run under conditions of extra-high velocity and low load (HHVLL). The first data column is a measure of the amount (or load) of aerosol (i.e., polyalpha-olefin oil mist) in the gas stream. The second and third columns show velocity of the gas stream and the volume flow of gas per unit length (height) of the fiber bed 35. The fourth through seventh columns contain data pertaining to the resistance to gas flow provided by the fiber bed 35. The fourth column shows the pressure drop across the fiber bed 35. The fifth and sixth columns show flow resistance ($C_o$), which is the ratio of the pressure drop over the gas stream velocity when the fiber bed 35 contains no liquid (column five) and when the fiber bed contains captured liquid from the gas stream (column six). The seventh column (W/D) is the ratio of the wet flow resistance to the dry flow resistance. Columns 8 through 12 show the efficiency of the fiber bed 35 in removing particles of the size (in microns) indicated. The final column shows the overall efficiency of the fiber bed 35 at removing all combined particles sizes. An Anderson Mark IV cascade impactor designed for gravimetrically measuring particle side distribution and aerosol loading in gas streams was used to acquire the data.

The data show that for the same gas stream flow rate and aerosol loading conditions, the fiber bed 135 constructed according to the principles of the present invention provides less resistance to flow of gas through the fiber bed while achieving the same or better efficiencies in removing particles. The differences are particularly dramatic at low velocity and low load conditions. At low velocity/low load (LVLL), the flow resistances in both wet and dry conditions for the prototype fiber bed 35 are lower than for the glass roving fiber bed. However, the efficiency of particle removal is better at every measured particle size and overall. The efficiency improvement for very large and very small particles is particularly dramatic. Similar results are found for high velocity/low load (HVLL) comparisons between the prototype fiber bed 35 and the glass roving fiber bed. It may be seen that for all measured conditions, the particle removal efficiency remains uniformly high across the range of particle sizes.

Referring now to FIG. 15, the performance of the fiber bed 35 of the present invention at different bed thicknesses under different conditions is shown. Data for the efficiency of the fiber bed 35 at 0.6 inches (1.5 cm) compressed thickness is used to calculate results for fiber beds of other thicknesses. The first condition is low velocity and low load (LVLL). As may be seen the gas stream velocity and aerosol load are the same, 23.4 ft/min (7.1 m/min) and 1.8 mg/ft$^3$ (64 mg/m$^3$), respectively. As may be seen the collection efficiency for particles in the gas stream having a size of 0.3 microns or more is nearly 100% until the thickness of the fiber bed is dropped to 0.3 inches (0.8 cm). There are many applications in which a lower efficiency is acceptable. Although the efficiency falls off at a thickness of 0.3 inches (0.8 cm), the efficiency remains high enough for practical application. The second set of conditions are for low velocity, but high load (LVHL). The velocity is the same as for LVLL, but the mist to be removed is increased to 47.4 mg/ft$^3$ (1,674 mg/m$^3$). The collection efficiency of 0.3 micron particles for fiber bed thicknesses from 0.6 inches (1.5 cm) to 1.2 inches (3.0 cm) remains very high. The efficiency drops off somewhat more for the fiber bed having a thickness of 0.3 inches (0.8 cm) than under LVLL conditions.

A third set of conditions is at a high velocity, but a low load. The operation under low loading conditions is again very good for all thicknesses. Substantially 100% of 0.3 micron particles are collected at all bed thicknesses. The table in FIG. 15 shows data for collection of 0.2 micron particles so that some variation in efficiency can be demonstrated. The fourth set of conditions is high velocity and high load. Again, at higher loads a greater differentiation in the collection of efficiency among the fiber beds of different thicknesses can be seen. However, the efficiencies remain within levels that have commercial application. Finally, a fifth set of conditions includes an extra high velocity at a low load. Even under very high velocity conditions the fiber bed of the present invention is able to extract a large percentage of the aerosol particles from the gas stream.

The fiber bed and fiber bed collecting media strip of the present invention provide several advantages. It has high efficiency at low loading and low gas stream velocity, with very low pressure drop across the fiber bed. At thicknesses of perhaps double those tested (e.g., 1.2 inches or 3 cm compressed thickness), collection efficiencies in the HEPA range (99.997 percent at 5 inches of H$_2$O or 1.25 kPa pressure drop) may be achieved. Moreover, the data support use of the collecting media strip at high gas stream velocities.

In view of the above, it will be seen that the several objects of the invention are achieved and other advantageous results obtained.

When introducing elements of the present invention or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above without departing from the scope of the invention, it is intended that all matter contained in the above description and shown in the accompanying drawings shall be interpreted as illustrative and not in a limiting sense.

What is claimed is:

1. A fiber bed assembly for a fiber bed mist eliminator used to remove aerosols and/or wetted soluble solids from a moving gas stream, the fiber bed assembly comprising:

a fiber bed support having a wall defining an upstream space and a downstream space, the wall including openings therein to permit the gas stream to move generally freely through the wall from the upstream space to the downstream space;

a fiber bed supported by the fiber bed support and generally covering the wall openings so that the gas stream passes through the fiber bed moving from the upstream space to the downstream space, the fiber bed comprising a composite fiber bed collecting media strip including;

an outer layer comprising a mat of fibers constructed to provide structural integrity to the composite fiber bed collecting media strip, an inner layer comprising a mat of fibers constructed to provide structural integrity to the composite fiber bed collecting media strip, and an intermediate layer formed to have a higher collection efficiency than the inner and the outer layers, the intermediate layer being sandwiched between the outer and inner layers, the intermediate layer being non-needle punched, the outer layer and inner layer each comprising fibers having an average diameter of about 6 microns or more and the intermediate layer comprises fibers having an average diameter of about 5 microns or less, the fibers of the outer layer, inner layer and intermediate layer being made of glass, and the fibers of the inner and outer layers being needle punched.

2. A fiber bed assembly as set forth in claim 1 wherein the outer layer, inner layer and intermediate layer are free of any fixed interconnection with each other.

3. A fiber bed assembly as set forth in claim 1 wherein the composite fiber bed collecting media strip has a width less than a height of the fiber bed support wall, the composite fiber bed collecting media strip being wrapped in multiple turns around the fiber bed support, at least some of the turns extending along a spiral path.

4. A fiber bed assembly as set forth in claim 3 wherein at least some of the turns of the composite fiber bed collecting media strip overlap adjacent ones of the turns.

5. A fiber bed assembly as set forth in claim 4 wherein the adjacent turns of the composite fiber bed collecting media strip are overlapped so as to form a drainage overhang at the location where the adjacent turns overlap thereby permitting a lower edge of the turn of the composite fiber bed collecting media strip to drain liquid from the turn.

6. A fiber bed assembly as set forth in claim 5 further comprising a layer of drainage material disposed between adjacent turns of the composite fiber bed collecting media strip and projecting generally below the overhang.

7. A fiber bed assembly as set forth in claim 6 further comprising a master layer of drainage material located in generally opposed relation with portions of the drainage layer projecting from between adjacent turns of the composite fiber bed collecting media strip for receiving captured liquid and soluble solids to be drained from the drainage layer between the adjacent turns.

8. A fiber bed assembly as set forth in claim 4 wherein the overlap of adjacent turns of the fiber bed collecting media strip is sufficient to inhibit gas bypassing the fiber bed at the location of the overlap.

9. A fiber bed assembly as set forth in claim 8 wherein the overlapping adjacent turns of the fiber bed collecting media strip have an overlap of between about two inches (5 cm) and about six inches (15 cm).

10. A fiber bed assembly as set forth in claim 8 wherein the overlapping adjacent turns of the fiber bed collecting media strip have an overlap of between about two inches (5.1 cm) and about three inches (8 cm).

11. A fiber bed assembly as set forth in claim 4 wherein the outer layer has indicia thereon for use in aligning a longitudinal edge of the composite fiber bed collecting media strip of one turn of the composite fiber bed collecting media strip with the preceding turn of the composite fiber bed collecting media strip.

12. A fiber bed assembly as set forth in claim 4 wherein the fiber bed collecting media strip constitutes a first fiber bed collecting media strip, the fiber bed further comprising a second fiber bed collecting media strip overlying the first fiber bed collecting media strip.

13. A fiber bed assembly as set forth in claim 12 wherein the first and second fiber bed media strips have longitudinal edges generally in registration with each other.

14. A fiber bed assembly as set forth in claim 1 wherein the compressed thickness of the composite fiber bed collecting media strip is less than or equal to about 0.6 inches (1.5 cm).

15. A fiber bed assembly as set forth in claim 1 wherein the fibers of the intermediate layer have an average diameter of about 4 microns or less.

16. A fiber bed assembly as set forth in claim 1 wherein the fiber bed further comprises a drainage layer.

17. A fiber bed assembly as set forth in claim 16 wherein the drainage layer is sandwiched between the inner layer and the outer layer.

18. A fiber bed assembly as set forth in claim 17 wherein the fibers of the outer layer, inner layer and intermediate layer are more resistant to wetting by the aerosol in the gas stream than fibers of the drainage layer.

19. A fiber bed assembly for a fiber bed mist eliminator used to remove aerosols and/or wetted soluble solids from a moving gas stream, the fiber bed assembly comprising:

a fiber bed support having a wall defining an upstream space and a downstream space, the wall including openings therein to permit the gas stream to move generally freely through the wall from the upstream space to the downstream space;

a fiber bed supported by the fiber bed support and generally covering the wall openings so that the gas stream passes through the fiber bed moving from the upstream space to the downstream space, the fiber bed comprising a composite fiber bed collecting media strip including;

an outer layer comprising a mat of fibers constructed to provide structural integrity to the composite fiber bed collecting media strip, an inner layer comprising a mat of fibers constructed to provide structural integrity to the composite fiber bed collecting media strip, and an intermediate layer sandwiched between the outer and inner layers, the intermediate layer being non-needle punched;

wherein the outer and inner layers are joined together at least at one of their longitudinal edge margins of the outer and inner layers.

20. A fiber bed assembly as set forth in claim 19 wherein the longitudinal edge margins of the outer and inner layers are joined together by at least one of: sewing, stapling, heat fusing and gluing.

21. A fiber bed assembly as set forth in claim 1 wherein the intermediate layer is a meltblown fiber batting.

22. A fiber bed assembly as set forth in claim 1 wherein fibers of the intermediate layer are free of chemical bonding with each other.

23. A fiber bed assembly as set forth in claim 22 wherein the fiber bed collecting media strip is pleated.

24. A fiber bed assembly for a fiber bed mist eliminator used to remove aerosols and/or wetted soluble solids from a moving gas stream, the fiber bed assembly comprising:

a fiber bed support having a wall defining an upstream space and a downstream space, the wall including openings therein to permit the gas stream to move generally freely through the wall from the upstream space to the downstream space, the fiber bed support wall comprising an inner screen and an outer screen arranged in generally opposed relation, the fiber bed being disposed between the inner and outer screens, each screen comprising a mesh including horizontal wires and vertical wires crossing over and being interconnected with each other, the screens being arranged so that the horizontal wires of the inner screen are vertically offset from the horizontal wires of the outer screen;

a fiber bed supported by the fiber bed support and generally covering the wall openings so that the gas stream passes through the fiber bed moving from the upstream space to the downstream space, the fiber bed comprising a composite fiber bed collecting media strip including;

an outer layer comprising a mat of fibers constructed to provide structural integrity to the composite fiber bed collecting media strip, an inner layer comprising a mat of fibers constructed to provide structural integrity to the composite fiber bed collecting media strip, and an intermediate layer formed to have a higher collection efficiency than the inner and the outer layers, the intermediate layer being sandwiched between the outer and inner layers, the intermediate layer being non-needle punched.

25. A fiber bed collecting media strip for forming a fiber bed of a mist eliminator used to remove aerosols and/or wetted soluble solids from a moving gas stream, the fiber bed being adapted to generally cover a support structure of the mist eliminator for generally blocking flow of the gas stream through the support structure except for through the fiber bed, the fiber bed collecting media strip comprising:

an outer layer comprising a mat of fibers constructed to provide structural integrity to the composite fiber bed collecting media strip;

an inner layer comprising a mat of fibers constructed to provide structural integrity to the composite fiber bed collecting media strip; and an intermediate layer sandwiched between the outer and inner layers, the intermediate layer being non-needle punched;

wherein the outer and inner layers are joined together along at least one longitudinal edge margin of the outer and inner layers by at least one of: sewing, stapling, heat fusing and gluing.

26. A fiber bed collecting media strip as set forth in claim 25 wherein the intermediate layer is joined to the outer and inner layers along said one longitudinal edge margin.

27. A fiber bed collecting media strip as set forth in claim 25 wherein the outer and inner layers are joined together along both longitudinal edge margins of the outer and inner layers.

28. A fiber bed collecting media strip as set forth in claim 25 wherein the uncompressed thickness of the composite fiber bed collecting media strip is less than or equal to about 1.2 inches (3 cm).

29. A fiber bed collecting media strip as set forth in claim 25 wherein the outer layer and inner layer each comprise fibers having an average diameter of about 6 microns or more and the intermediate layer comprises fibers having an average diameter of about 5 microns or less.

30. A fiber bed collecting media strip as set forth in claim 29 wherein the fibers of the intermediate layer have an average diameter of about 4 microns or less.

31. A fiber bed collecting media strip for forming a fiber bed of a mist eliminator used to remove aerosols and/or wetted soluble solids from a moving gas stream, the fiber bed being adapted to generally cover a support structure of the mist eliminator for generally blocking flow of the gas stream through the support structure except for through the fiber bed, the fiber bed collecting media strip comprising:

an outer layer comprising a mat of fibers constructed to provide structural integrity to the composite fiber bed collecting media strip;

an inner layer comprising a mat of fibers constructed to provide structural integrity to the composite fiber bed collecting media strip; and an intermediate layer sandwiched between the outer and inner layers, the intermediate layer being non-needle punched;

the outer layer and inner layer each comprising fibers having an average diameter of about 6 microns or more and the intermediate layer comprising fibers having an average diameter of about 5 microns or less the fibers of the outer layer, inner layer and intermediate layer being made of glass, and the outer and inner layers being needle punched.

32. A fiber bed collecting media strip for forming a fiber bed of a mist eliminator used to remove aerosols and/or wetted soluble solids from a moving gas stream, the fiber bed being adapted to generally cover a support structure of the mist eliminator for generally blocking flow of the gas stream through the support structure except for through the fiber bed, the fiber bed collecting media strip comprising:

an outer layer comprising a mat of fibers constructed to provide structural integrity to the composite fiber bed collecting media strip;

an inner layer comprising a mat of fibers constructed to provide structural integrity to the composite fiber bed collecting media strip;

an intermediate layer sandwiched between the outer and inner layers, the intermediate layer being non-needle punched; and a drainage layer sandwiched between the inner layer and the outer layer within the composite fiber bed collecting media strip.

33. A fiber bed collecting media strip as set forth in claim 32 wherein the fibers of the outer layer, inner layer and intermediate layer are treated so as to make them resistant to wetting by the aerosol in the gas stream and fibers of the drainage layer are free of any treatment to make them resistant to wetting by the aerosol.

34. A fiber bed collecting media strip as set forth in claim 25 wherein the outer layer has indicia thereon for use in aligning a longitudinal edge of the composite fiber bed collecting media strip of one turn of the composite fiber bed collecting media strip with a preceding turn of the composite fiber bed collecting media strip when the composite fiber bed collecting media strip is wrapped around the support structure of the mist eliminator.

35. A fiber bed collecting media strip as set forth in claim 25 where in the fiber bed collecting media strip is in a roll.

36. A fiber bed collecting media strip as set forth in claim 25 wherein the intermediate layer comprises fibers having an average diameter of about 3 microns or less interspersed in fibers having a greater average diameter.

37. A fiber bed collecting media strip as set forth in claim 36 wherein the interspersed fibers have an average diameter falling in the range of about 0.01 microns to about 3 microns.

38. A composite fiber bed collecting media strip for use in making a fiber bed for a fiber bed mist eliminator used to remove aerosols and/or wetted soluble solids from a moving gas stream, the fiber bed being adapted to generally cover a support structure of the fiber bed assembly for generally blocking flow of the gas stream through the support structure except for through the fiber bed, the composite fiber bed collecting media strip comprising:
- an outer layer of fibers constructed to provide structural integrity to the composite fiber bed collecting media strip;
- an inner layer of fibers constructed to provide structural integrity to the composite fiber bed collecting media strip; and
- an intermediate layer sandwiched between the outer and inner layers, the intermediate layer being more efficient in the removal of aerosols from the gas stream than the outer and inner layers;
- at least the outer and inner layers being formed to separate into strips including an outer layer section, and inner layer section and an intermediate layer section, the inner and outer layers each having frangible portions in generally overlying relation, the frangible portions being breakable to separate the inner and outer layers into the strips.

39. A composite fiber bed collecting media strip as set forth in claim 38 wherein the outer and inner layers are joined together at locations along at least one side of the aligned frangible portions.

40. A composite fiber bed collecting media strip as set forth in claim 39 wherein the outer and inner layers are joined together at the locations by at least one of: sewing, stapling, heat fusing and gluing.

41. A composite fiber bed collecting media strip as set forth in claim 38 wherein the frangible portion of each of the outer and inner layer comprises a line of perforations.

42. A composite fiber bed collecting media strip as set forth in claim 38 wherein the composite fiber bed collecting media strip is in a roll.

43. A composite fiber bed collecting media strip as set forth in claim 38 wherein the uncompressed thickness of the composite fiber bed collecting media strip is less than or equal to about 1.2 inches (3 cm).

44. A composite fiber bed collecting media strip as set forth in claim 38 wherein the outer layer and inner layer each comprise fibers having an average diameter of about 6 microns or more and the intermediate layer comprises fibers having an average diameter of about 5 microns or less.

45. A composite fiber bed collecting media strip as set forth in claim 44 wherein the fibers of the intermediate layer have an average diameter of about 4 microns or less.

46. A composite fiber bed collecting media strip as set forth in claim 44 wherein the fibers of the outer layer, inner layer and intermediate layer are made of glass.

47. A composite fiber bed collecting media strip as set forth in claim 38 further comprising a drainage layer sandwiched between the inner layer and the outer layer.

48. A composite fiber bed collecting media strip as set forth in claim 38 wherein the outer layer has indicia thereon for use in aligning a longitudinal edge of the composite fiber bed collecting media strip of one turn of the fiber bed collecting media strip with the preceding turn of the composite fiber bed collecting media strip when the composite fiber bed collecting media strip is wrapped around the support structure of the fiber bed mist eliminator.

49. A fiber bed assembly for a fiber bed mist eliminator used to remove aerosols and/or wetted soluble solids from a moving gas stream, the fiber bed assembly comprising:

a fiber bed support having a wall defining an upstream space and a downstream space, the wall including openings therein to permit the gas stream to move generally freely through the wall from the upstream space to the downstream space;

a fiber bed supported by the fiber bed support and generally covering the wall openings so that the gas stream passes through the fiber bed moving from the upstream space to the downstream space, the fiber bed comprising an elongate fiber bed collecting media strip wrapped around the fiber bed support in multiple turns, at least some of the turns extending along a spiral path, the fiber bed collecting media strip being generally flat and at least some of the turns overlapping adjacent turns, the fiber bed further comprises sealing material disposed over the fiber bed collecting media strip at locations where turns of the fiber bed collecting media strip overlap each other for sealing between overlapping turns, the sealing material permitting flow of gas therethrough.

50. A fiber bed assembly as set forth in claim 49 wherein the sealing material comprises a generally cylindrical roving wound on the fiber bed support.

51. A fiber bed assembly as set forth in claim 50 wherein the roving is located only where the turns of the flat fiber bed collecting media strip overlap.

52. A fiber bed assembly for a fiber bed mist eliminator used to remove aerosols and/or wetted soluble solids from a moving gas stream, the fiber bed assembly comprising:

a fiber bed support having a wall defining an upstream space and a downstream space, the wall including openings therein to permit the gas stream to move generally freely through the wall from the upstream space to the downstream space;

a fiber bed supported by the fiber bed support and generally covering the wall openings so that the gas stream passes through the fiber bed moving from the upstream space to the downstream space, the fiber bed comprising an elongate fiber bed collecting media strip wrapped around the fiber bed support, at least some of the turns extending along a spiral path, at least some of the turns overlapping adjacent turns, and an intermediate drainage layer located between adjacent turns of the fiber bed collecting media strip.

53. A fiber bed assembly as set forth in claim 52 wherein the intermediate drainage layer includes a portion projecting outward from between adjacent, overlapping turns of the fiber bed collecting media strip.

54. A fiber bed assembly as set forth in claim 53 wherein the adjacent turns of the fiber bed collecting media strip are overlapped so as to form a drainage overhang at the location where the adjacent turns overlap thereby permitting a lower edge of the turn of the fiber bed collecting media strip to drain liquid from the turn.

55. A fiber bed assembly as set forth in claim 54 wherein the projecting portion of the intermediate drainage layer generally underlies the overhang.

56. A fiber bed assembly as set forth in claim 55 further comprising a master layer of drainage material located in generally opposed relation with the portions of the intermediate drainage layer projecting from between adjacent turns of the fiber bed collecting media strip for receiving captured liquid and soluble solids to be drained from the intermediate drainage layer between the adjacent turns.

57. A fiber bed collecting media strip for use in making a fiber bed for a fiber bed mist eliminator used to remove aerosols and/or wetted soluble solids from a moving gas stream, the fiber bed being adapted to generally cover a support structure of the fiber bed mist eliminator for generally blocking flow of the gas stream through the support structure except for through the fiber bed, the fiber bed collecting media strip comprising an elongate strip formed of fibers capable of removing aerosols from the moving gas stream, the strip having opposite longitudinal edges and being sized for covering the support structure by wrapping around the support structure in multiple overlapping turns, the strip having opposite, generally flat faces, at least one of the faces having an alignment marking thereon located a distance from one of the longitudinal edges of the strip for aligning the opposite longitudinal edge of an adjacent turn of the strip.

58. A fiber bed collecting media strip as set forth in claim 57 wherein the alignment marking extends generally parallel to at least one of the edges.

59. A fiber bed collecting media strip as set forth in claim 58 wherein the alignment marking is located nearer one of the longitudinal edges of the strip, and at least about two inches (6 cm) from the nearer longitudinal edge.

60. A fiber bed assembly for a fiber bed mist eliminator used to remove aerosols and/or wetted soluble solids from a moving gas stream, the fiber bed assembly comprising:

a fiber bed support having a wall defining an upstream space and a downstream space, the wall including openings therein to permit the gas stream to move generally freely through the wall from the upstream space to the downstream space;

a fiber bed supported by the fiber bed support and generally covering the wall openings so that the gas stream passes through the fiber bed moving from the upstream space to the downstream space, the fiber bed comprising a composite fiber bed collecting media strip including;

a first layer comprising a mat of fibers constructed to provide structural integrity to the fiber bed, and a collection layer supported by the first layer, the collection layer being non-needle punched, the collection layer having a higher collection efficiency than the first layer, and the first layer and collection layer being joined together along at least one of their longitudinal edge margins.

* * * * *